US012532885B2

United States Patent
Pu et al.

(10) Patent No.: US 12,532,885 B2
(45) Date of Patent: Jan. 27, 2026

(54) REDUCED MISTING PERACID BASED CLEANING, SANITIZING, AND DISINFECTING COMPOSITIONS VIA THE USE OF HIGH MOLECULAR WEIGHT POLYMERS

(71) Applicant: ECOLAB USA INC., Saint Paul, MN (US)

(72) Inventors: Gang Pu, Saint Paul, MN (US); Victor Fuk-Pong Man, Saint Paul, MN (US); Michael William Willer, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 402 days.

(21) Appl. No.: 17/448,012

(22) Filed: Sep. 17, 2021

(65) Prior Publication Data

US 2022/0087258 A1    Mar. 24, 2022

Related U.S. Application Data

(60) Provisional application No. 63/198,557, filed on Oct. 27, 2020, provisional application No. 62/706,934, filed on Sep. 18, 2020.

(51) Int. Cl.

| | | |
|---|---|---|
| A01N 37/16 | (2006.01) | |
| A01N 25/06 | (2006.01) | |
| A01N 25/10 | (2006.01) | |
| A01N 25/14 | (2006.01) | |
| A01N 25/32 | (2006.01) | |
| A01P 1/00  | (2006.01) | |

(52) U.S. Cl.
CPC ............. *A01N 37/16* (2013.01); *A01N 25/06* (2013.01); *A01N 25/10* (2013.01); *A01N 25/14* (2013.01); *A01N 25/32* (2013.01); *A01P 1/00* (2021.08)

(58) Field of Classification Search
CPC ........ A01N 37/16; A01N 25/06; A01N 25/10; A01N 25/14; A01N 25/32; A01N 41/04; A01P 1/00
See application file for complete search history.

(56) References Cited

U.S. PATENT DOCUMENTS

| | | |
|---|---|---|
| 6,514,556 B2 | 2/2003 | Hilgren et al. |
| 6,627,657 B1 | 9/2003 | Hilgren et al. |
| 6,635,286 B2 | 10/2003 | Hei et al. |
| 6,828,294 B2 | 12/2004 | Kellar et al. |
| 6,844,305 B1 | 1/2005 | Depoot et al. |
| 6,900,167 B2 | 5/2005 | Griese et al. |
| 6,903,062 B2 | 6/2005 | Griese et al. |
| 7,150,884 B1 | 12/2006 | Hilgren et al. |
| 7,288,274 B2 | 10/2007 | Hilgren et al. |
| 7,316,824 B2 | 1/2008 | Hilgren et al. |
| 7,381,439 B2 | 6/2008 | Hilgren et al. |
| 7,498,051 B2 | 3/2009 | Man et al. |
| 7,504,123 B2 | 3/2009 | Man et al. |
| 7,638,067 B2 | 12/2009 | Hilgren et al. |
| 7,771,737 B2 * | 8/2010 | Man ....................... A23B 2/754 424/455 |
| 7,832,360 B2 | 11/2010 | Hilgren et al. |
| 8,020,520 B2 | 9/2011 | Hilgren et al. |
| 8,124,132 B2 | 2/2012 | Hilgren et al. |
| 8,128,976 B2 | 3/2012 | Man et al. |
| 8,226,939 B2 | 7/2012 | Herdt et al. |
| 8,246,429 B2 | 8/2012 | Hilgren et al. |
| 8,293,697 B2 | 10/2012 | Boutique et al. |
| 8,424,493 B2 | 4/2013 | Hilgren et al. |
| 9,084,421 B2 | 7/2015 | McSherry |
| 9,247,738 B2 | 2/2016 | Hilgren et al. |
| 9,254,400 B2 | 2/2016 | Hilgren et al. |
| 9,283,202 B2 | 3/2016 | Neas et al. |
| 9,540,598 B2 | 1/2017 | Gohl et al. |
| 10,342,231 B2 | 7/2019 | Hilgren et al. |
| 10,370,626 B2 | 8/2019 | Man et al. |
| 10,392,587 B2 | 8/2019 | Man et al. |
| 2008/0199535 A1 | 8/2008 | Taylor et al. |

(Continued)

FOREIGN PATENT DOCUMENTS

| | | |
|---|---|---|
| EP | 0842604 A1 | 5/1998 |
| WO | 2013043699 A2 | 3/2013 |

(Continued)

OTHER PUBLICATIONS

International Searching Authority in connection with PCT/US2021/050858 filed Sep. 17, 2021, "The International Search Report and the Written Opinion of the International Searching Authority, or the Declaration", 16 pages, mailed Jan. 14, 2022.

(Continued)

*Primary Examiner* — Snigdha Maewall

(74) *Attorney, Agent, or Firm* — McKee, Voorhees & Sease, PLC

(57) ABSTRACT

Aqueous compositions for cleaning, sanitizing, and/or disinfecting using peroxycarboxylic acid compositions in combination with a high molecular weight polymer are provided. The compositions have a modified droplet size of the peroxycarboxylic acid composition when sprayed onto a surface in need of cleaning, sanitizing, and/or disinfecting. The compositions and methods of making and/or employing increase the use solution droplet size when sprayed to reduce the vapor level in the air to provide a composition having reduced inhalation risk coupled with the cleaning, sanitizing, and/or disinfecting properties.

15 Claims, 16 Drawing Sheets

(56) References Cited

U.S. PATENT DOCUMENTS

| | | |
|---|---|---|
| 2012/0329138 A1 | 12/2012 | Van Kaathoven et al. |
| 2013/0065959 A1 | 3/2013 | Ho |
| 2013/0121944 A1 | 5/2013 | Leyrer et al. |
| 2017/0335253 A1 | 11/2017 | Man et al. |
| 2017/0335254 A1* | 11/2017 | Man ..................... C11D 3/3947 |
| 2018/0249704 A1 | 9/2018 | Man et al. |
| 2020/0404951 A1* | 12/2020 | Marsh ..................... A23B 4/24 |

FOREIGN PATENT DOCUMENTS

| | | |
|---|---|---|
| WO | 2015148063 A1 | 10/2015 |
| WO | 2019125917 A1 | 6/2019 |
| WO | 2019161291 A1 | 8/2019 |

OTHER PUBLICATIONS

Dow Chemical Company Ltd—Safety Data Sheet—Polyox(TM) WSR 301, 9 pages, 2014.

Jaguar®, "Product Guide for Personal Care Solutions", Solvay Novecare, 14 pages, Aug. 2015.

Xing et al., "Parameters Influencing the Spray Behavior of Waterborne Coatings", Journal of Coatings Technology, vol. 71, No. 890, pp. 37-50, Mar. 1999.

\* cited by examiner

FIG. 9C

REDUCED MISTING PERACID BASED CLEANING, SANITIZING, AND DISINFECTING COMPOSITIONS VIA THE USE OF HIGH MOLECULAR WEIGHT POLYMERS

CROSS-REFERENCE TO RELATED APPLICATIONS

This application claims priority under 35 U.S.C. § 119 to Provisional Application U.S. Ser. No. 62/706,934, filed on Sep. 18, 2020, and Provisional Application U.S. Ser. No. 63/198,557, filed on Oct. 27, 2020, which are herein incorporated by reference in their entireties including without limitation, the specifications, claims, and abstracts, as well as any figures, tables, or examples thereof.

FIELD OF THE INVENTION

The present invention relates to the field of aqueous compositions for cleaning, sanitizing, and/or disinfecting using peroxycarboxylic acid compositions. In some embodiments, peroxycarboxylic acid use solution compositions are provided in combination with a high molecular weight polymer to modify the droplet size of the composition when sprayed onto a surface in need of cleaning, sanitizing, and/or disinfecting while maintaining an effective spray pattern for applying the compositions to various surfaces. Beneficially, the amount of use solution droplets having an increased droplet size when sprayed reduces the vapor level in the air and therefore provides a composition having reduced inhalation risk coupled with the cleaning, sanitizing, and/or disinfecting properties.

BACKGROUND OF THE INVENTION

Antimicrobial agents are chemical compositions that are used to prevent microbiological contamination and deterioration of products, materials, mediums and systems. Antimicrobial agents and compositions are used, for example, as disinfectants or sanitizers in association with hard surface cleaning, food preparation, animal feed, cooling water, hospitality services, hospital and medical uses, pulp and paper manufacturing, cleaning textiles, and water processing. When various antimicrobial agents and compositions containing them are sprayed onto surfaces, the spray devices create a spray pattern of the composition that contacts the target hard surface. The majority of the composition comes to reside on the target surface, while a small portion of the sprayable composition may become an airborne aerosol or mist consisting of small particles (e.g. an airborne mist or finely divided aerosol) of the cleaning composition that can remain suspended or dispersed in the atmosphere surrounding the dispersal site for a period of time, such as between about 5 seconds to about 10 minutes. Such airborne mist or finely divided aerosol generated during the spraying process can present a substantial problem as they can be inhaled by persons applying the compositions and/or in the vicinity for the seconds to minutes following application of the composition.

There is a desire to apply aqueous peroxycarboxylic acid compositions for use for cleaning, sanitizing, and/or disinfecting. However, conventional peroxycarboxylic acids such as peroxyacetic acid result in a vapor levels which can cause finely divided aerosols or mists that can be inhaled and potentially can cause respiratory distress in a user. This presents concerns and may not comply with various regulatory requirements with respect to short term and/or long term exposure limits, as well as can present strong and irritating smells and/or cause irritation to a person in contact with the vapors, mists and/or aerosols. Conventional solutions to reduce the respiratory distress risks include, formulating sprayable aqueous compositions with reduced quantities of the acidic cleaning components. However, such reduction in concentration (or substitution) of these materials can reduce the cleaning activity and effectiveness of the material when used. Despite improvements seen in sprayable aqueous compositions there remains a need for improved peroxycarboxylic acid compositions having reduced misting and therefore reduced inhalation, while providing efficacious cleaning, sanitizing and disinfecting.

There have been developments and improvements to polymers for increasing the size of sprayable particles to reduce vapor levels, including those disclosed in EP 202,780 disclosing particulate cross-linked copolymers of acrylamide with at least 5 mole percent dialkylaminoalkyl acrylate; U.S. Pat. No. 4,950,725 disclosing the addition of a cross-linking agent both at the beginning, and during the polymerization process under conditions such that its availability for reaction is substantially constant throughout the process; EP 374,458 disclosing water-soluble branched high molecular weight cationic polymers; EP 363,024 disclosing chain transfer agent at the conclusion of polymerization of a DADMAC/acrylamide copolymer; U.S. Pat. No. 4,913,775 disclosing use of substantially linear cationic polymers such as acrylamide/dimethylaminoethyl acrylate methyl chloride quaternary salt copolymers; U.S. Pat. No. 5,393,381 disclosing branched cationic polyacrylamide powder such as an acrylamide/dimethylaminoethyl acrylate quaternary salt copolymer; and WO2002002662 disclosing water-soluble cationic, anionic, and nonionic polymers, synthesized using water-in-oil emulsion, dispersion, or gel polymerization and having a fast rate of solubilization, higher reduced specific viscosities. Other conventional teachings of thickening agents include food grade thickeners, such as xanthan gum, guar gum, arrowroot, cornstarch, katakuri starch, potato starch, tapioca, sago, alginin, locust bean gum, collagen, gelatin, agar, carrageenan pectin, cellulose gum, gum Arabic, and the like, as taught for example in WO2019125917.

There remains a need for improvements for peroxycarboxylic acid compositions to reduce misting and vapor pressure through increasing elongational viscosity of use compositions while maintaining a desired spray pattern to effectively apply the compositions for cleaning, sanitizing and disinfecting. Therefore, it is an object of the compositions and methods described herein to reduce misting and therefore inhalation risk of such compositions at use solutions. It is an object of the compositions to reduce misting of peroxycarboxylic acid compositions, such that an increase in the droplet size of an applied solution reduces misting and atomization. It is a further object of the compositions to maintain suitable spray patterns with particle size distribution with the increased droplet size that reduces the peroxycarboxylic acid air concentration. This beneficially provides efficacious spray delivery of the compositions, such as at animal processing plants.

Other objects, advantages and features of the present invention will become apparent from the following specification taken in conjunction with the accompanying drawings.

BRIEF SUMMARY OF THE INVENTION

The compositions according to the invention provides the ability to increase the particle size of peroxycarboxylic acid compositions using high molecular weight polymers. It is an advantage of the liquid compositions disclosed herein that the inhalation risk by the user of said compositions is significantly reduced or diminished as a result of the increase in droplet sizes of the composition when sprayed onto a surface. Thus, the compositions herein avoid potential health issues like nose and/or throat irritation and/or coughing or even lung damage. A further advantage is that also eye irritation and/or damage is prevented when using the peroxycarboxylic acid compositions. The various benefits are provided by the peroxycarboxylic acid compositions having maintained and/or enhanced antimicrobial efficacy as a result of incorporation of high molecular weight polymers in the compositions.

In embodiments a peroxycarboxylic acid use composition comprises a peroxycarboxylic acid and a high molecular weight polymer, wherein the polymer is physically compatible with the peroxycarboxylic acid with minimal or no carboxyl groups, and wherein the peroxycarboxylic acid is modified by the high molecular weight polymer to have a median particle size that is greater than about 50 microns (μm) in diameter, and wherein the use composition has an increased elongational viscosity providing a desired spray pattern without increasing shear viscosity. In embodiments the composition further comprises a carboxylic acid, hydrogen peroxide and/or water. In embodiments, the high molecular weight polymer is: (a) a polysaccharide or gum without carboxyl groups, such as a guar gum or diutan gum, wherein embodiments with a diutan gum is present at a use concentration of about 500 ppm or greater, or about 1000 ppm or greater, and wherein embodiments with guar gum is present at a use concentration of about 500 ppm or greater, or about 1000 ppm or greater, and preferably is food grade; (b) a polyethylene oxide having the formula $C_{2n}H_{4n+2}O_{n+1}$ wherein n is from 2,000 to 190,000, and in embodiments the polyethylene oxide is present at a use concentration of about 100 ppm or greater, or between about 100-200 ppm, and/or wherein the polyethylene oxide has a molecular weight of at least about 3,000,000 Da, or between about 4,000,000 Da and about 8,000,000 Da; and/or (c) a cationic polymer having monomers that include dialkylaminoalkyl acrylates, methacrylates and/or their quaternary or acid salts.

In any of the embodiments, the composition has a viscosity of 1 to 1000 cPs, preferably from 1 to 100 cPs. In any of the embodiments, the pH of the composition is between about 0 and about 7, between about 1 and about 7, between about 2 and about 7, between about 3 and about 7, between about 4 and about 7, or between about 5 and about 7. In any of the embodiments the peroxycarboxylic acid is a $C_1$-$C_{22}$ peroxycarboxylic acid and is present in the use solution from about 10 ppm to about 1,500 ppm. In any of the embodiments, the composition can further comprise at least one additional functional ingredient, wherein the additional functional ingredient comprises a peroxycarboxylic acid stabilizer, surfactant, additional thickener and/or viscosity modifier, solvent, solubility modifier, humectant, metal protecting agent, stabilizing agent, corrosion inhibitor, sequestrant and/or chelating agent, pH modifying component, fragrance and/or dye, hydrotrope or coupler, and a buffer. In any of the embodiments, the composition is formed at a point or application of use.

In additional embodiments a method of increasing peroxycarboxylic acid composition particle size to reduce vapor levels and inhalation risk comprises: combining a high molecular weight polymer with a peroxycarboxylic acid to make a cleaning composition according to any one of compositions described; and increasing the particle size of the cleaning composition in a use solution when sprayed to having a median particle size greater than about 10 microns and thereby reducing the vapor level in the air to reduce inhalation risk. In any of the embodiments the vapor pressure of the peroxycarboxylic acid is reduced, wherein misting of the use solution of the cleaning composition is reduced, and/or wherein atomization of the use solution of the cleaning composition is reduced. In any of the embodiments the combining of the high molecular weight polymer and the peroxycarboxylic acid can be at a point of use and/or dilution. In any of the embodiments the combining of the high molecular weight polymer and the peroxycarboxylic acid is in a formulated use or concentrate composition. In any of the embodiments the spraying of the cleaning composition use solution uses a trigger sprayer or a commercially acceptable spray nozzle. In any of the embodiments the combining of the high molecular weight polymer with the peroxycarboxylic acid reduces the total number of particle sizes having a diameter between about 0.1 to about 10 microns (μm). In any of the embodiments the combining of the high molecular weight polymer with the peroxycarboxylic acid reduces misting and atomization of the use solution.

In further embodiments a method of cleaning, sanitizing, and/or disinfecting comprising: applying to a substrate a cleaning composition as described herein; wherein the composition provides at least 4 log kill on treated surfaces while providing a reduced inhalation risk. In any of the embodiments the applying step is by spraying the composition onto the substrate. In any of the embodiments the substrate is a hard surface or a food surface, such as an animal protein (e.g. poultry). In any of the embodiments at least about 10 ppm or at least about 20 ppm peroxycarboxylic acid is applied to the substrate.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE FIGURES

FIGS. 9A-9C show measured PAA air concentration over time using with varying concentrations of the high molecular weight polymer (POLYOX WSR 303 polyethylene oxide thickener); FIG. 9A shows the measurements over approximately 1 hour, FIG. 9B is an expanded version of the graph depicting the measured air concentration over approximately 3 minutes, and FIG. 9C shows the results of the 100 ppm versus 200 ppm high molecular weight polymer for additional time beyond what is shown in the FIG. 9B.

FIGS. 10A-10B show measured PAA air concentration over time using a lower concentration of PAA (compared to FIGS. 9A-9C) with varying concentrations of the high molecular weight polymer (POLYOX WSR 303 polyethylene oxide thickener); FIG. 10A shows the measurements over approximately 20 minutes, and FIG. 10B is an expanded version of the graph depicting the measured air concentration over approximately 2.5 minutes.

FIGS. 11A-11B show measured PAA air concentration over time using 1500 ppm PAA with varying concentrations of the high molecular weight polymer guar gum; FIG. 11A shows the measurements over approximately 1 hour, and FIG. 11B is an expanded version of the graph depicting the measured air concentration over approximately 3 minutes.

FIG. 12 shows the relation of the total surface area and droplet numbers with a constant mass.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular compositions, methods of making and/or methods of employing the same for cleaning, sanitizing, and/or disinfecting, which can vary and are understood by skilled artisans. So that the invention may be more readily understood, certain terms are first defined. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

As used herein, the terms "aerosol" and "mist" refer to airborne dispersions of small particles comprising the cleaning composition that can remain suspended or dispersed in the atmosphere surrounding a cleaning site for at least 5 seconds, more commonly 15 seconds to 10 minutes.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Preferably, a straight or branched saturated aliphatic hydrocarbon chain having from 1 to 22 carbon atoms, such as, for example, methyl, ethyl, propyl, isopropyl (1-methylethyl), butyl, tert-butyl (1,1-dimethylethyl), and the like.

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

Figure 1:
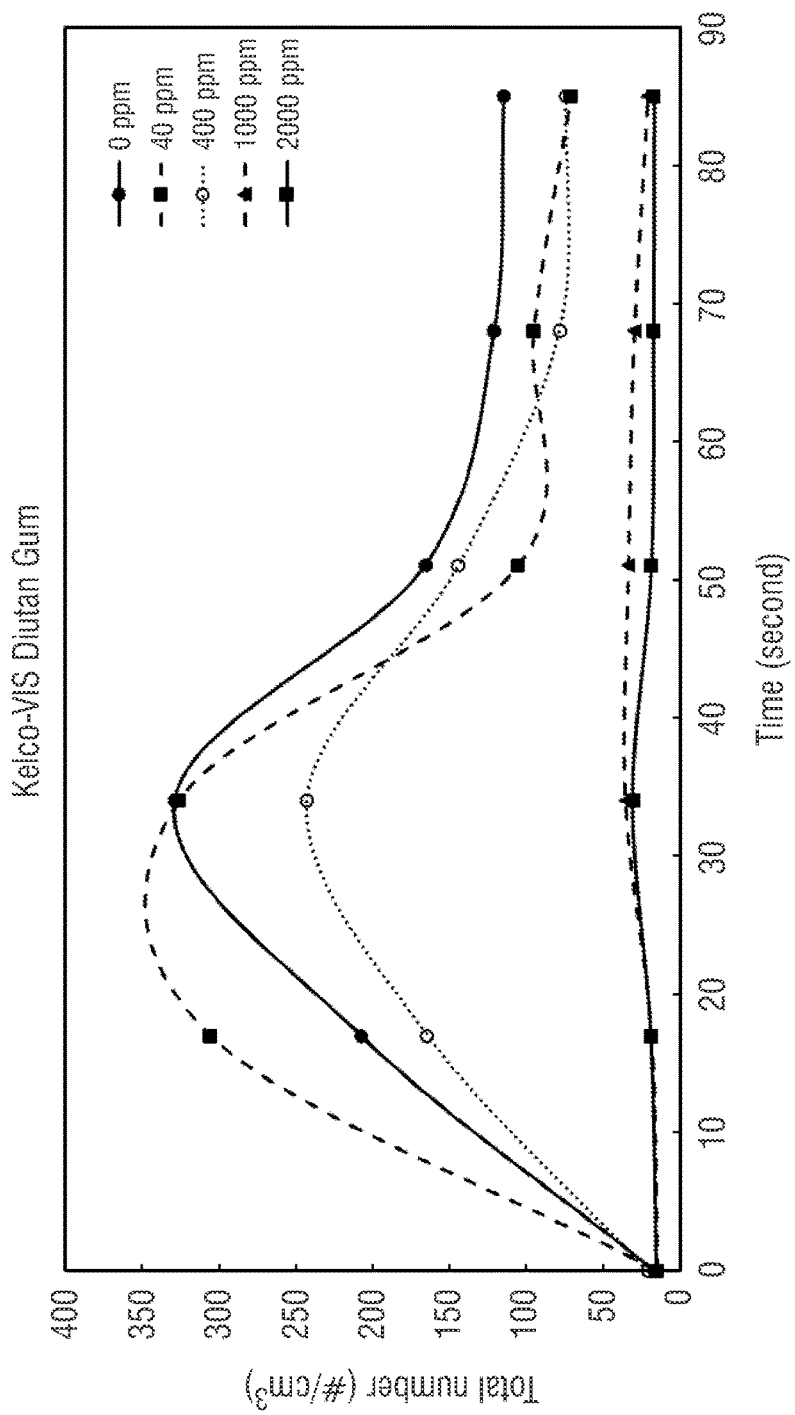
FIG. 1 shows the total number of particles sized 0.1 to 10 μm per $cm^3$ over time for PAA use solutions with varying amounts of Kelco-VIS diutan gum.
Figure 2:
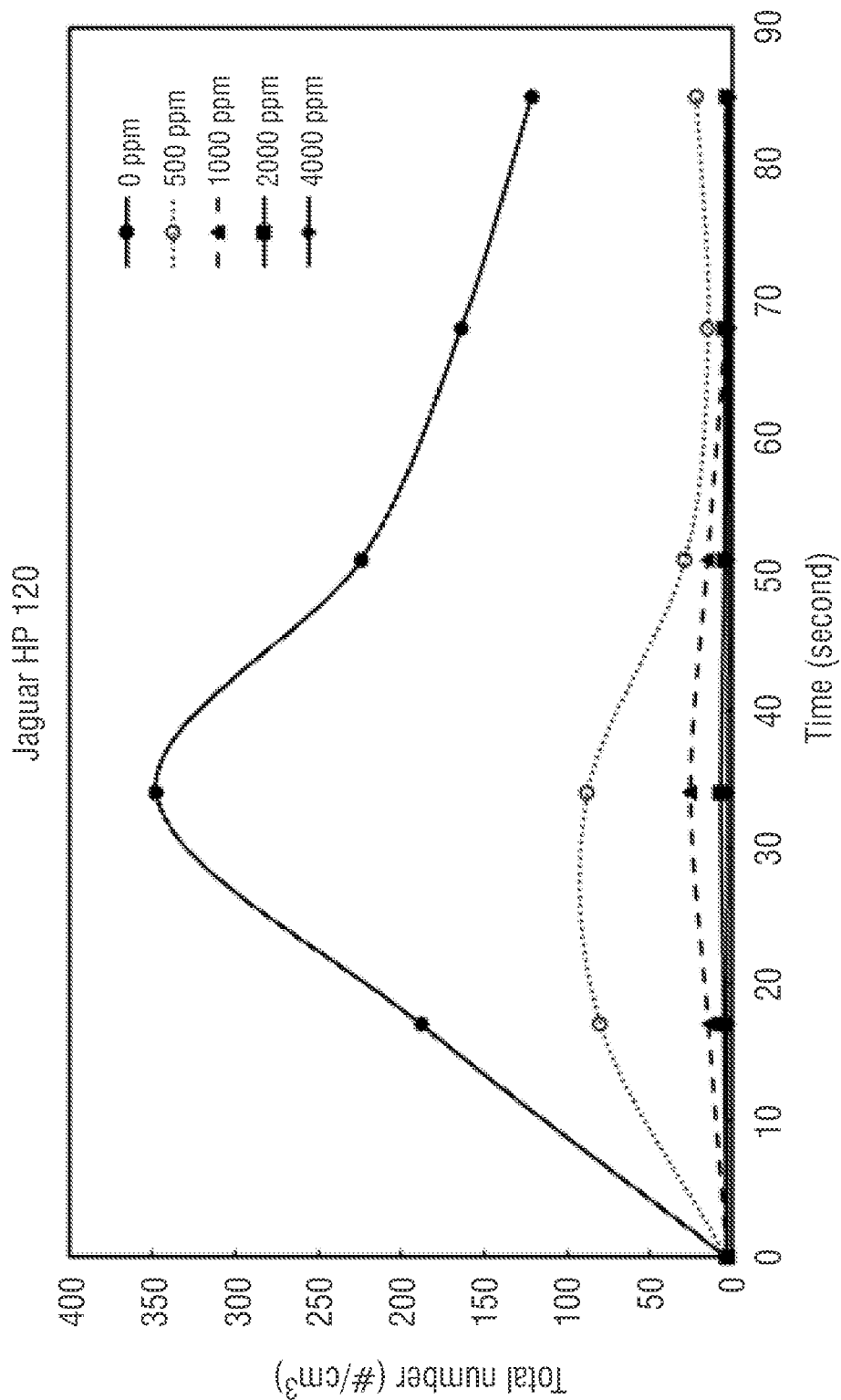
FIG. 2 shows the total number of particles sized 0.1 to 10 μm per $cm^3$ over time for PAA use solutions with varying amounts of Jaguar HP 120 guar gum.
Figure 3:
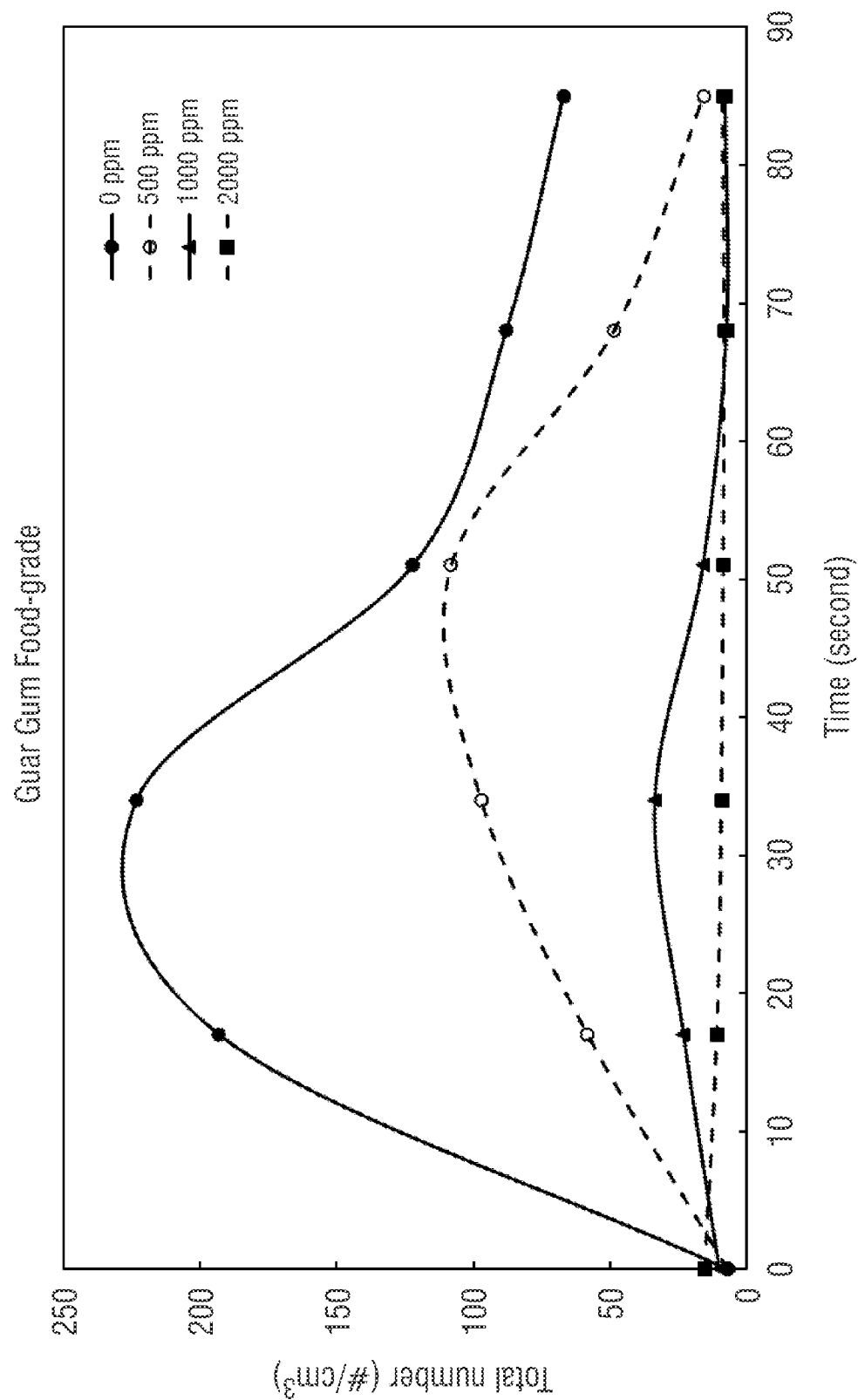
FIG. 3 shows the total number of particles sized 0.1 to 10 μm per $cm^3$ over time for PAA use solutions with varying amounts of food-grade guar gum.
Figure 4:
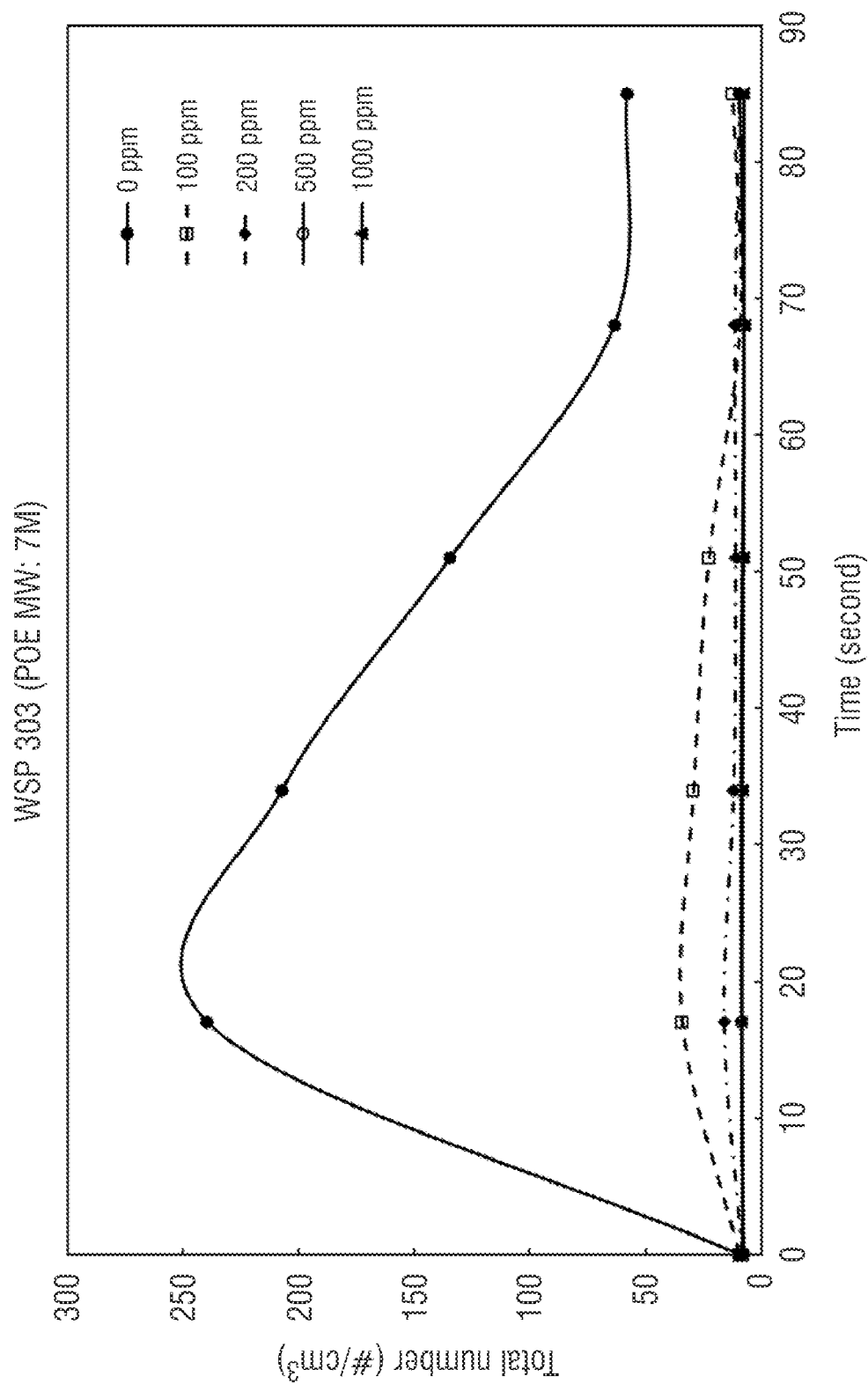
FIG. 4 shows the total number of particles sized 0.1 to 10 μm per $cm^3$ over time for PAA use solutions with varying amounts of WSR 303, a polyethylene oxide thickener.

The term "alkenyl" includes an unsaturated aliphatic hydrocarbon chain having from 2 to 12 carbon atoms, such as, for example, ethenyl, 1-propenyl, 2-propenyl, 1-butenyl, 2-methyl-1-propenyl, and the like. The alkyl or alkenyl can be terminally substituted with a heteroatom, such as, for example, a nitrogen, sulfur, or oxygen atom, forming an aminoalkyl, oxyalkyl, or thioalkyl, for example, aminomethyl, thioethyl, oxypropyl, and the like. Similarly, the above alkyl or alkenyl can be interrupted in the chain by a heteroatom forming an alkylaminoalkyl, alkylthioalkyl, or alkoxyalkyl, for example, methylaminoethyl, ethylthiopropyl, methoxymethyl, and the like.

Further, as used herein the term "alicyclic" includes any cyclic hydrocarbyl containing from 3 to 8 carbon atoms. Examples of suitable alicyclic groups include cyclopropanyl, cyclobutanyl, cyclopentanyl, etc. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. Additional examples of suitable heterocyclic groups include groups derived from tetrahydrofurans, furans, thiophenes, pyrrolidines, piperidines, pyridines, pyrrols, picoline, coumaline, etc.

Alkyl, alkenyl, alicyclic groups, and heterocyclic groups can be unsubstituted or substituted by, for example, aryl, heteroaryl, $C_{1-4}$ alkyl, $C_{1-4}$ alkenyl, $C_{1-4}$ alkoxy, amino, carboxy, halo, nitro, cyano, —$SO_3H$, phosphono, or hydroxy. When alkyl, alkenyl, alicyclic group, or heterocyclic group is substituted, preferably the substitution is $C_{1-4}$ alkyl, halo, nitro, amido, hydroxy, carboxy, sulpho, or phosphono. In one embodiment, R includes alkyl substituted with hydroxy. The term "aryl" includes aromatic hydrocarbyl, including fused aromatic rings, such as, for example, phenyl and naphthyl. The term "heteroaryl" includes heterocyclic aromatic derivatives having at least one heteroatom such as, for example, nitrogen, oxygen, phosphorus, or sulfur, and includes, for example, furyl, pyrrolyl, thienyl, oxazolyl, pyridyl, imidazolyl, thiazolyl, isoxazolyl, pyrazolyl, isothiazolyl, etc. The term "heteroaryl" also includes fused rings in which at least one ring is aromatic, such as, for example, indolyl, purinyl, benzofuryl, etc.

Aryl and heteroaryl groups can be unsubstituted or substituted on the ring by, for example, aryl, heteroaryl, alkyl, alkenyl, alkoxy, amino, carboxy, halo, nitro, cyano, —$SO_3H$, phosphono, or hydroxy. When aryl, aralkyl, or heteroaryl is substituted, preferably the substitution is $C_{1-4}$ alkyl, halo, nitro, amido, hydroxy, carboxy, sulpho, or phosphono. In one embodiment, R includes aryl substituted with $C_{1-4}$ alkyl.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). According to this reference a disinfectant should provide a 99.999% reduction (5-log order reduction) within 30 seconds at room temperature, 25±2° C., against several test organisms. According to embodiments of the invention, a disinfecting composition provides a 99.999% reduction (5-log order reduction) of the desired organisms (including bacterial contaminants) at a use temperature. Further, a disinfectant should provide a 99.99% reduction (4-log order reduction) within 30 seconds at room temperature, 25±2° C., against several test organisms. According to embodiments of the invention, a disinfecting composition provides a 99.99% reduction (4-log order reduction) of the desired organisms (including bacterial contaminants) at a use temperature. Further, a disinfectant should provide a 99.9% reduction (3-log order reduction) within 30 seconds at room temperature, 25±2° C., against several test organisms. According to embodiments of the invention, a disinfecting composition provides a 99.9% reduction (3-log order reduction) of the desired organisms (including bacterial contaminants) at a use temperature.

As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration.

As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA).

As used herein, the term "low-level disinfection" or "low level disinfectant" refers to a compound or composition that kills some viruses and bacteria with a chemical germicide registered as a hospital disinfectant by the EPA. The term or abbreviation "EDTA 4Na+" refers to ethylenediaminetetraacetic acid, tetrasodium salt.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g. red meat, pork and other proteins), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces including instruments and food processing surfaces.

As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection. Differentiation of antimicrobial "-cidal" or "-static" activity, the definitions which describe the degree of efficacy, and the official laboratory protocols for measuring this efficacy are considerations for understanding the relevance of antimicrobial agents and compositions. Cleaning compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic. A sanitizer and a disinfectant are, by definition, agents which provide antimicrobial or microbiocidal activity. In contrast, a preservative is generally described as an inhibitor or microbiostatic composition.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae.

As used herein the term "poultry" refers to all forms of any bird kept, harvested, or domesticated for meat or eggs, and including chicken, turkey, ostrich, game hen, squab, guinea fowl, pheasant, quail, duck, goose, emu, or the like and the eggs of these birds. Poultry includes whole, sectioned, processed, cooked or raw poultry, and encompasses all forms of poultry flesh, by-products, and side products. The flesh of poultry includes muscle, fat, organs, skin, bones and body fluids and like components that form the animal. Forms of animal flesh include, for example, the whole or part of animal flesh, alone or in combination with other ingredients. Typical forms include, for example, processed poultry meat, such as cured poultry meat, sectioned and formed products, minced products, finely chopped products and whole products.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms. According to embodiments of the invention, a sanitizing composition provides a 99.999% reduction (5-log order reduction) of the desired organisms (including bacterial contaminants) at a use temperature. Further, a sanitizer should provide a 99.99% reduction (4-log order reduction) within 30 seconds at room temperature, 25±2° C., against several test organisms. According to embodiments of the invention, a sanitizing composition provides a 99.99% reduction (4-log order reduction) of the desired organisms (including bacterial contaminants) at a use temperature. Further, a sanitizer should provide a 99.9% reduction (3-log order reduction) within 30 seconds at room temperature, 25±2° C., against several test organisms. According to embodiments of the invention, a sanitizing composition provides a 99.9% reduction (3-log order reduction) of the desired organisms (including bacterial contaminants) at a use temperature.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Cleaning compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic. A sanitizer and a disinfectant are, by definition, agents which provide antimicrobial or microbiocidal activity. In contrast, a preservative is generally described as an inhibitor or microbiostatic composition.

The term "viscosity" is used herein to describe a property of the sprayable aqueous compositions for cleaning, sanitizing and disinfecting according to the invention. As one skilled in the art understands, both dynamic (shear) viscosity and bulk viscosity can be used to describe characteristics of the compositions. The shear viscosity of a liquid describes its resistance to shearing flows. The bulk viscosity of a liquid describes its ability to exhibit a form of internal friction that resists its flow without shear. The measurements of viscosity described herein use the physical untill of poise (P) or centipoise (cPs) and can be measured by conventional standard methods including Brookfield Viscometer, DV-II spindle 2, 30 rpm, 20° C. (approximately 68T).

As used herein, "weight percent," "wt.-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt.-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Peroxycarboxylic Acid Compositions

Peroxycarboxylic acid compositions comprise of at least one peroxycarboxylic acid at a use solution with at least one high molecular weight polymer in order to provide cleaning activity with a reduced acute toxicity due to inhalation hazards as a result of reduced misting and vapor pressure and therefore reduced inhalation risk of the composition. The compositions comprise, consist of or consist essentially of at least one peroxycarboxylic acid and at least one high molecular weight polymer compound. In other embodiments, the compositions comprise, consist of or consist essentially of at least one peroxycarboxylic acid, corresponding carboxylic acid, hydrogen peroxide, water, and at least one high molecular weight polymer compound.

In some embodiments, the compositions may be dispensed with a trigger sprayer, such as non-low velocity or a low velocity trigger sprayer. The compositions may be dispensed in alternative manners as well. Any commercially acceptable spray nozzle can be employed and additional description of exemplary methods are set forth in the Methods of Use disclosure. The compositions beneficially provide little to no misting of the formulations as a result of the increase in elongational viscosity while maintaining a shear viscosity comparable to the shear viscosity of water. The compositions result in an increased elongational viscosity as a result of the peroxycarboxylic acid modified by the high molecular weight polymer to have a median particle size that is greater than about 10 microns ($\mu$m), or preferably greater than about 50 microns ($\mu$m) in diameter, and providing a desired spray patter as result of the increased elongational viscosity without any significant increase in the shear viscosity.

Depending on the choice of polymers, some of the composition may be referred to as a non-Newtonian fluid. Newtonian fluids have a short relaxation time and have a direct correlation between shear and elongational viscosity (the elongational viscosity of the fluid equals three times the shear viscosity). Shear viscosity is a measure of a fluid's ability to resist the movement of layers relative to each other. Elongational viscosity, which is also known as extensional viscosity, is a measure of a fluid's ability to stretch elastically under elongational stress. Non-Newtonian fluids do not have a direct correlation between shear and elongational viscosity and are able to store elastic energy when under strain, giving exponentially more elongational than shear viscosity and producing an effect of thickening under strain (i.e., shear thickening). These properties of non-Newtonian fluids result in the cleaning composition that has a low viscosity when not under shear but that thickens when under stress from the trigger sprayer forming larger droplets.

In some embodiments, the composition has a relatively low shear viscosity when not under strain. In an embodiment, the shear viscosity of the composition containing the high molecular weight polymers is comparable to the shear viscosity of water and may be referred to as a "thin liquid". A suitable shear viscosity for the compositions containing the high molecular weight polymers is from about 1 to 1000 cPs, preferably from 1 to 100 cPs.

In some embodiments, the median particle size of the use solution of the peroxycarboxylic acid composition is sufficiently large to reduce misting and thereby reduce the inhalation risk associated with high misting compositions. As one skilled in the art appreciates, particles having droplet size of less than about 10 microns ($\mu$m) can be readily inhaled. Moreover, particles having droplet size of less than about 0.1 microns ($\mu$m) can be readily inhaled into the lungs. Therefore, in many aspects the testing and evaluation of the compositions focus on the reduction of misting, in particular reduction or elimination of micron ($\mu$m) sizes of about 10 or less. In an embodiment there is at least about a 50% reduction, at least about a 60% reduction, at least about a 70% reduction, at least about an 80% reduction, or at least about a 90% reduction in particles sizes of about 10 micron ($\mu$m) or less.

In an aspect of the invention, a suitable median particle size (i.e. diameter) is about 10 microns or greater, about 11 microns or greater, about 15 microns or greater, about 20 microns or great, about 25 microns or greater, about 30 microns or greater, about 40 microns or greater, about 50 microns or greater, about 70 microns or greater, about 80 microns or greater, about 90 microns or greater, about 100 microns or greater, about 150 microns or greater, or about 200 microns or greater. The suitable median particle size may depend on the composition of the use composition, including diluted and/or ready to use compositions (RTU). For example, a suitable median particle size for a peroxyacetic acid use composition may be about 50 microns or greater.

The compositions beneficially provide stable compositions in terms of retained performance of the peroxycarboxylic acid, solution stability, and microbial efficacy, wherein the high molecular weight polymer and the peroxycarboxylic acid retain stability for at least about one year at ambient temperature of about 60° F. to about 80° F., or at least about two years at ambient temperature of about 60° F. to about 80° F. The stability is measured by the maintained antimisting properties of the compositions.

In an aspect, the compositions according to the invention comprise, consist of, and/or consist essentially of the components as shown in Table 1 in use solutions as parts per million (ppm). The use solutions can be formulated into a concentrate composition. The use solutions can also be generated at or near a point of use. In an exemplary embodiment a peroxycarboxylic acid is diluted to a desired use concertation for a particular application of use and a high molecular weight polymer is added prior to application (e.g. spraying) of the use solution of the composition.

TABLE 1

| Material | First Exemplary Range ppm | Second Exemplary Range ppm | Third Exemplary Range ppm |
|---|---|---|---|
| Peroxycarboxylic acid | 1-5,000 | 5-2,000 | 10-1,500 |
| High Molecular Weight Polymer | 20-5,000 | 50-2,000 | 100-1,200 |
| Water and/or Additional Optional Functional Ingredients (e.g. stabilizers, acid additives, etc.) | Remainder | Remainder | Remainder |

In a preferred embodiment a peroxycarboxylic acid composition can be diluted and/or combined with the high molecular weight polymer at a point of use or prior to use (instead of formulating the high molecular weight polymer with the peroxycarboxylic acid in a composition). The embodiment of Table 1 shows the use solution of peroxycarboxylic and high molecular weight polymer, which could be combined at a point of use or formulated into a single composition (either concentrate or use).

The peroxycarboxylic acid compositions set forth in the above Table can have any suitable pH for application of use, including from about 1 to 12. However, according to aspects of the invention, the use solution preferably has an acidic to neutral pH depending on a particular application of use thereof, including from about 0 to 7. Without limiting the scope of invention, the numeric ranges are inclusive of the numbers defining the range and include each integer within the defined range.

Peroxycarboxylic Acid

According to the invention, a peroxycarboxylic acid (i.e. peracid) is included for antimicrobial efficacy in the compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid," "peracid" and others used herein. The terms "sulfoperoxycarboxylic acid," "sulfonated peracid," or "sulfonated peroxycarboxylic acid" refers to the peroxycarboxylic acid form of a sulfonated carboxylic acid. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peroxycarboxylic acid includes any compound of the formula R—(COOOH)$_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl.

The peroxycarboxylic acids include any peroxycarboxylic acids, including varying lengths of peroxycarboxylic acids (e.g., C1-22) that can be prepared from any suitable methods and conditions. For example, the peroxycarboxylic acid can be prepared via the acid-catalyzed equilibrium reaction between a carboxylic acid and hydrogen peroxide. A peroxycarboxylic acid can also be prepared by the auto-oxidation of aldehydes or by the reaction of hydrogen peroxide with an acid chloride, acid hydride, carboxylic acid anhydride, sodium alcoholate or alkyl and aryl esters. Alternatively, peroxycarboxylic acids can be prepared through non-equilibrium reactions, which may be generated for use in situ.

In some embodiments, a peroxycarboxylic acid includes at least one water-soluble peroxycarboxylic acid in which R includes alkyl of 1-22 carbon atoms. For example, in one embodiment, a peroxycarboxylic acid includes peroxyacetic acid. In another embodiment, a peroxycarboxylic acid has R that is an alkyl of 1-22 carbon atoms substituted with a hydroxyl group or other polar substituent such that the substituent improves the water solubility. Methods of preparing peroxyacetic acid are known to those of skill in the art including those disclosed in U.S. Pat. No. 2,833,813, which is herein incorporated herein by reference in its entirety. In other embodiments, the peroxycarboxylic may be a combination of a short chain peroxycarboxylic acid, including for example peroxyacetic acid and/or a medium chain peroxycarboxylic acid, including for example those disclosed in U.S. Pat. No. 7,887,641, which is herein incorporated by reference in its entirety.

In an aspect, any suitable $C_1$-$C_{22}$ percarboxylic acid can be used in the present compositions. In some embodiments, the $C_1$-$C_{22}$ percarboxylic acid is a $C_2$-$C_{20}$ percarboxylic acid. In other embodiments, the $C_1$-$C_{22}$ percarboxylic is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ carboxylic acid.

In an embodiment, the peroxycarboxylic acid can be formed in situ generally follows the reaction of hydrogen peroxide with the carboxylic acid (e.g., octanoic acid or mixture of octanoic acid and acetic acid) as shown below.

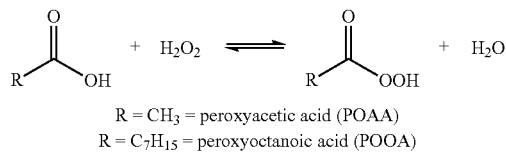

R = CH$_3$ = peroxyacetic acid (POAA)
R = C$_7$H$_{15}$ = peroxyoctanoic acid (POOA)

In another embodiment, a sulfoperoxycarboxylic acid can be employed and has the following formula:

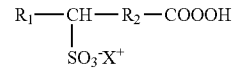

wherein $R_1$ is hydrogen, or a substituted or unsubstituted alkyl group; $R_2$ is a substituted or unsubstituted alkylene group; X is hydrogen, a cationic group, or an ester forming moiety; or salts or esters thereof. In some embodiments, $R_1$ is a substituted or unsubstituted Cm alkyl group; X is hydrogen a cationic group, or an ester forming moiety; $R_2$ is a substituted or unsubstituted Cn alkyl group; m=1 to 10; n=1 to 10; and m+n is less than 18, or salts, esters or mixtures thereof.

In some embodiments, $R_1$ is hydrogen. In other embodiments, $R_1$ is a substituted or unsubstituted alkyl group. In some embodiments, $R_1$ is a substituted or unsubstituted alkyl group that does not include a cyclic alkyl group. In some embodiments, $R_1$ is a substituted alkyl group. In some embodiments, $R_1$ is an unsubstituted $C_1$-$C_9$ alkyl group. In some embodiments, $R_1$ is an unsubstituted $C_7$ or $C_8$ alkyl. In other embodiments, $R_1$ is a substituted $C_8$-$C_{10}$ alkylene group. In some embodiments, $R_1$ is a substituted $C_8$-$C_{10}$ alkyl group is substituted with at least 1, or at least 2 hydroxyl groups. In still yet other embodiments, $R_1$ is a substituted $C_1$-$C_9$ alkyl group. In some embodiments, $R_1$ is a substituted $C_1$-$C_9$ substituted alkyl group is substituted with at least 1 SO$_3$H group. In other embodiments, $R_1$ is a $C_9$-$C_{10}$ substituted alkyl group. In some embodiments, $R_1$ is a substituted $C_9$-$C_{10}$ alkyl group wherein at least two of the carbons on the carbon backbone form a heterocyclic group. In some embodiments, the heterocyclic group is an epoxide group.

In some embodiments, $R_2$ is a substituted $C_1$-$C_{10}$ alkylene group. In some embodiments, $R_2$ is a substituted $C_8$-$C_{10}$ alkylene. In some embodiments, $R_2$ is an unsubstituted $C_6$-$C_9$ alkylene. In other embodiments, $R_2$ is a $C_8$-$C_{10}$ alkylene group substituted with at least one hydroxyl group. In some embodiments, $R_2$ is a Cm alkylene group substituted with at least two hydroxyl groups. In other embodiments, $R_2$ is a $C_8$ alkylene group substituted with at least one SO$_3$H group. In some embodiments, $R_2$ is a substituted $C_9$ group, wherein at least two of the carbons on the carbon backbone form a heterocyclic group. In some embodiments, the heterocyclic group is an epoxide group. In some embodiments, $R_1$ is a $C_5$-$C_9$ substituted or unsubstituted alkyl, and $R_2$ is a $C_7$-$C_8$ substituted or unsubstituted alkylene. These and other suitable sulfoperoxycarboxylic acid compounds for use in the stabilized peroxycarboxylic acid compositions of the invention are further disclosed in U.S. Pat. No. 8,344,026, which are incorporated herein by reference in its entirety.

Various commercial formulations of peracids are available, including for example peracetic acid (approximately 15%) available as EnviroSan or Victory (Ecolab, Inc., St. Paul MN). Most commercial peracid solutions state a specific percarboxylic acid concentration without reference to the other chemical components in a use solution. In preferred embodiments, the sanitizing rinse additive compositions exhibit low to no odor in the concentrated formulation. In a further preferred aspect, a low odor peracid is employed, such as peroxyoctanoic acid (POOA), to allow significantly increased concentration of the peracid in the sanitizing rinse aid composition without increasing the odor. According to some preferred embodiments, the peroxycarboxylic acid is not a peroxyacetic acid (containing the corresponding carboxylic acid acetic acid). According to other embodiments, the concentration of POAA in a concentrate composition is less than about 2 wt-%, and preferably less than about 1 wt-%.

In embodiments providing a use solution, the peroxycarboxylic acid can be used at any suitable concentration. In some embodiments, the peroxycarboxylic acid has a use concentration from about 10 ppm to about 5,000 ppm, 10 ppm to about 4,000 ppm, 10 ppm to about 3,000 ppm, 10 ppm to about 2,000 ppm, from about 20 ppm to about 2,000 ppm, from about 10 ppm to about 1,500 ppm, from about 20 ppm to about 1,500 ppm, from about 200 to about 1,200 ppm, or from about 500 ppm to about 1,200 ppm. In exemplary preferred commercial applications for treating protein surfaces, the peroxycarboxylic acid has a use concentration from about 10 ppm to about 2,000 ppm, from about 20 ppm to about 2,000 ppm, from about 40 ppm to about 2,000 ppm, from about 10 ppm to about 220 ppm, or from about 20 ppm to about 220 ppm. Without limiting the scope of invention, the numeric ranges are inclusive of the numbers defining the range and include each integer within the defined range.

In embodiments the C1-C22 percarboxylic acid can be used at any suitable concentration. In some embodiments, the C1-C22 percarboxylic acid has a concentration from about 0.1 wt-% to about 40 wt-% in a concentrated equilibrium composition. In other embodiments, the C1-C22 percarboxylic acid has a concentration from about 1 wt-% to about 40 wt-%, or from about 1 wt-% to about 20 wt-%. In still other embodiments, the C1-C22 percarboxylic acid has a concentration at about 1 wt-%, 2 wt-%, 3 wt-%, 4 wt-%, 5 wt-%, 6 wt-%, 7 wt-%, 8 wt-%, 9 wt-%, 10 wt-%, 11 wt-%, 12 wt-%, 13 wt-%, 14 wt-%, 15 wt-%, 16 wt-%, 17 wt-%, 18 wt-%, 19 wt-%, 20 wt-%, 25 wt-%, 30 wt-%, 35 wt-%, or 40 wt-%. Without limiting the scope of invention, the numeric ranges are inclusive of the numbers defining the range and include each integer within the defined range.

Carboxylic Acids

The peroxycarboxylic acid compositions can include a carboxylic acid with the peroxycarboxylic acid and hydrogen peroxide. A carboxylic acid includes any compound of the formula R—(COOH)$_n$ in which R can be hydrogen, alkyl, alkenyl, alkyne, acylic, alicyclic group, aryl, heteroaryl, or heterocylic group, and n is 1, 2, or 3. Preferably R includes hydrogen, alkyl, or alkenyl. The terms "alkyl," "alkenyl," "alkyne," "acylic," "alicyclic group," "aryl," "heteroaryl," and "heterocyclic group" are as defined above with respect to peracids. Examples of suitable carboxylic acids include a variety monocarboxylic acids, dicarboxylic acids, and tricarboxylic acids. Monocarboxylic acids include, for example, formic acid, acetic acid, propanoic acid, butanoic acid, pentanoic acid, hexanoic acid, heptanoic acid, octanoic acid, nonanoic acid, decanoic acid, undecanoic acid, dodecanoic acid, glycolic acid, lactic acid, salicylic acid, acetylsalicylic acid, mandelic acid, etc. Dicarboxylic acids include, for example, adipic acid, fumaric acid, glutaric acid, maleic acid, succinic acid, malic acid, tartaric acid, etc. Tricarboxylic acids include, for example, citric acid, trimellitic acid, isocitric acid, agaicic acid, etc.

In an aspect of the invention, a particularly well suited carboxylic acid is water soluble such as formic acid, acetic acid, propionic acid, butanoic acid, lactic acid, glycolic acid, citric acid, mandelic acid, glutaric acid, maleic acid, malic acid, adipic acid, succinic acid, tartaric acid, etc. Preferably a composition of the invention includes acetic acid, octanoic acid, or propionic acid, lactic acid, heptanoic acid, octanoic acid, or nonanoic acid. Additional examples of suitable carboxylic acids are employed in sulfoperoxycarboxylic acid or sulfonated peracid systems, which are disclosed in U.S. Pat. No. 8,344,026, herein incorporated by reference in their entirety.

Any suitable $C_1$-$C_{22}$ carboxylic acid can be used in the present compositions. In some embodiments, the $C_1$-$C_{22}$ carboxylic acid is a $C_2$-$C_{20}$ carboxylic acid. In other embodiments, the $C_1$-$C_{22}$ carboxylic acid is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ carboxylic acid. The $C_1$-$C_{22}$ carboxylic acid can be used at any suitable concentration to provide a desired concentration of a peroxycarboxylic acid. In some embodiments, the C1-C22 carboxylic acid has a concentration in an equilibrium composition from about 0.1 wt-% to about 80 wt-%. In other embodiments, the C1-C22 carboxylic acid has a concentration from about 1 wt-% to about 80 wt-%. In still other embodiments, the C1-C22 carboxylic acid has a concentration at about 1 wt-% to about 50 wt-%. Without limiting the scope of invention, the numeric ranges are inclusive of the numbers defining the range and include each integer within the defined range.

Oxidizing Agents

The compositions can also include an oxidizing agent, such as for an equilibrium peroxycarboxylic acid, such as hydrogen peroxide. Hydrogen peroxide, $H_2O_2$, provides the advantages of having a high ratio of active oxygen because of its low molecular weight (34.014 g/mole) and being compatible with numerous substances that can be treated by methods of the invention because it is a weakly acidic, clear, and colorless liquid. Another advantage of hydrogen peroxide is that it decomposes into water and oxygen. It is advantageous to have these decomposition products because they are generally compatible with substances being treated.

In one aspect, hydrogen peroxide is initially in an antimicrobial peroxycarboxylic acid composition in an amount effective for maintaining an equilibrium between a carboxylic acid, hydrogen peroxide, and a peroxycarboxylic acid. The amount of hydrogen peroxide should not exceed an amount that would adversely affect the antimicrobial activity of a composition of the invention. In further aspects of the invention, hydrogen peroxide concentration can be significantly reduced within an antimicrobial peroxycarboxylic acid composition. In some aspects, an advantage of minimizing the concentration of hydrogen peroxide is that antimicrobial activity of a composition of the invention is improved as compared to conventional equilibrium peroxycarboxylic acid compositions. The oxidizing agent (e.g. hydrogen peroxide) can be used at any suitable concentration to provide a desired concentration of a peroxycarboxylic acid.

The oxidizing agent, such as hydrogen peroxide, can be used at any suitable concentration. In some embodiments, a concentrated equilibrium composition has a concentration of hydrogen peroxide from about 0.5 wt-% to about 90 wt-%, or from about 1 wt-% to about 90 wt-%. In still other embodiments, the hydrogen peroxide has a concentration from about 1 wt-% to about 80 wt-%, from about 1 wt-% to about 50 wt-%. Without limiting the scope of invention, the numeric ranges are inclusive of the numbers defining the range and include each integer within the defined range.

High Molecular Weight Polymer

The compositions include a high molecular weight polymer component to increase the particle size and reduce vapor levels of the peroxycarboxylic acids. In an embodiment, the polymer has a high molecular weight of from about 100,000 Da to about 50 million Da, from about 500,000 Da to about 30 million Da, from about 1 million Da to about 25 million Da, and preferably from about 3 million Da to about 20 million Da. In various embodiments described herein, it is desired to use a polymer having a high molecular weight that is above 100,000, above 500,000, above 1,000,000, or even above 3,000,000 to utilize a polymer having a greater chain length to provide the benefits for the peroxycarboxylic acid compositions.

The high molecular weight polymers must be physically compatible with the peroxycarboxylic acid, including structures having minimal or no carboxyl groups on the polymer chain length and/or pendant groups. As referred to herein "physically compatible" (with respect to the high molecular weight polymers) refers to those polymers that are able to extend in a desired orientation within a medium, namely the peroxycarboxylic acid, in order to modify the median size of the peroxycarboxylic acid and not collapse within the composition or system.

In some embodiments, the polymers do not have carboxyl groups or have a relative decrease in carboxyl groups on the chain and/or pendant groups. As the carboxyl groups decrease in comparison to alternative or traditional 'thickening agents' with more carboxyl groups there is obtained an increase in particular size that benefits the peroxycarboxylic acid by reducing misting. Without being limited to a particular mechanism of action the carboxyl groups on the chain and/or pendant groups are protonated (controlled by pKa) under acidic conditions as is present with peroxycarboxylic acid compositions, and the protonation causes the collapse of the polymer which is then not capable of thickening the peroxycarboxylic acid composition or system. However, as one skilled in the art will ascertain, there is a spectrum for this effect on the polymer's ability to thicken a peroxycarboxylic acid as shown in the Examples and data demonstrating the impact of carboxyl groups on performance. Some high molecular weight polymers having carboxyl groups can still provide partial thickening and increasing in particle size. Although the high molecular weight polymers without carboxyl groups (e.g. polyethylene oxides (PEO)) perform best, various polysaccharides can provide benefits (e.g. diutan gum) which may vary depending on the concentration and pH of the peroxycarboxylic acid and the compatibility of the polymer with the peroxycarboxylic acid based on the amount of carboxyl groups. As one skilled in the art will ascertain, the polymer compatibility with the peroxycarboxylic acid cannot simply be overcome by increasing the concentration of the polymer utilized.

The high molecular weight polymers have at least partial water solubility in order to extend to provide rheology modification. Examples of suitable high molecular weight polymers include polysaccharides, preferably long-chain polysaccharides. Exemplary gums include natural gum-based polysaccharides are polygalactomannans like guar gums or locust bean gums, polygalactans like carrageenans, polyglucans like xanthan gums, polymannuronates like alginate. In some embodiments, preferred long-chain polysaccharides are those that do not have carboxyl groups.

In an embodiment, the gums include guar gums having the below basic structure of guar:

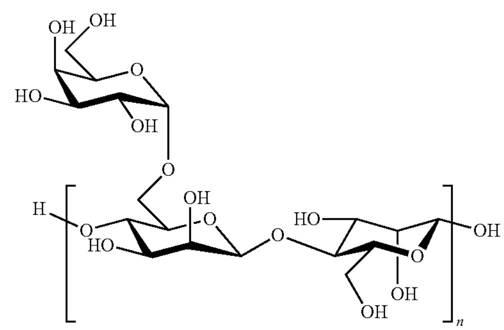

wherein n is any integer suitable to provide a desired molecular weight, including from about 2,000,000 Da or greater, and often between about 2,000,000 and about 3,000,000 Da.

In an embodiment cationic guar or cationic guar derivative (such as cationic guar ethers and cationic guar esters) can be employed as the high molecular weight polymers. Exemplary cationic guars include those obtained according to derivatization techniques such as those described in U.S. Pat. No. 5,756,720; EP0,686,643, EP1501873 and US2003/0044479. Additional exemplary, guar gums are modified guars such as guar gum 2-hydroxypropyl ether or other cationically modified guars such as Guar gum 2 hydroxy-3-(trimethylammonium)propyl ether, including those described in U.S. Pat. No. 9,624,455. Examples of commercially-available guar gums include Carboxymethyl Hydroxypropyl Guar Gum, available as Jaguar HP120 (Solvay), 2 hydroxy-3-(trimethylammonium)propyl ether chloride, available as Mirapol Surf N ADW or Jaguar C17, Jaguar C500 and Jaguar C1000 (Rhodia), 2-hydroxypropyl ether, such as Jaguar HP 8 and Jaguar HP 105 (Rhodia).

Further examples of suitable high molecular weight polymers include polysaccharides that are gums with minimal carboxyl groups on the chain length and/or pendant groups, including diutan gums which are high molecular weight natural microbial polysaccharides. The structure of diutan gums is as shown:

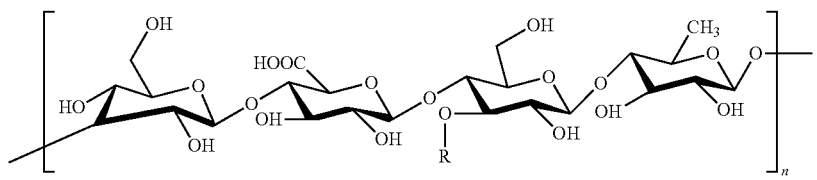

wherein R is

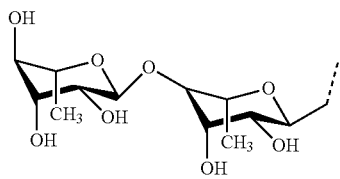

and n is an integer between 1-6000, or between 1500-6000, or between 1900-5800. In an embodiment, the molecular weight of the diutan gums is between about $2.5-5.5 \times 10^6$ g/mol. Diutan gums are water-inactivated or partially water-inactivated. Commercially available diutan gums include KELCO-CRETE 80, KELCO-CRETE 200, KOC617, KELCO-VIS DG and DG-F diutan gums from CP Kelco US Inc. An exemplary commercially available diutan gum is a natural high molecular weight microbial polysaccharide, secreted by the bacterium *Sphingomonas* spp. It is an anionic biopolymer and consists of a repeat unit with b-1,3-d-glucopyranosyl, b-1,4-d-glucuronopyranosyl, b-1,4-d-glucopyranosyl, and -1,4-1-rhamnopyranosyl, and a two-saccharide L-rhamnopyranosyl side-chain attached to the (1→4) linked glucopyranosyl residue. In embodiments, the diutan gums are powders.

Further examples of suitable high molecular weight polymers include polyethylene oxides (PEO), also referred to as polyethylene glycols and polyoxyethylene. PEO are high molecular weight, nonionic water-soluble polymers. PEO can have a molecular weight between about 100,000 Da and about 8,000,000 Da. Further exemplary PEO can have a molecular weight between about 3,000,000 Da and about 7,000,000 Da. Commercially available PEOs include Polyox WSR 301, which has a molecular weight of about 4,000,000 Da and WSR 303, which has a molecular weight of about 7,000,000 Da, each commercially available from Dow. The exemplary PEO are a mixture product further containing fumed silica and calcium as mixed salts.

The polyethylene oxides have the general formula $C_{2n}H_{4n+2}O_{n+1}$ and the general structure as follows where there are no carboxyl groups:

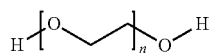

where n is any integer from 2,000 to 190,000.

The various high molecular weight polymers can preferably be provided as dried or powder polymers.

Further suitable high molecular weight polymers include cationic monomers, including dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylamidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, diallyldimethylammonium chloride, and the like.

In a preferred embodiment, the monomers are acrylamide and diallyldimethylammonium chloride. In a further preferred embodiment, the monomers are acrylamide and dimethylaminoethylacrylate methyl chloride quaternary salt. In a further preferred embodiment, the monomers are acrylamide, dimethylaminoethylacrylate benzyl chloride quaternary salt and dimethylaminoethylacrylate methyl chloride quaternary salt. Representative copolymers of acrylic acid and acrylamide useful as microparticles include Nalco® 8677 PLUS, available from Nalco Chemical Company, Naperville, IL, USA. Other copolymers of acrylic acid and acrylamide are described in U.S. Pat. No. 5,098,520, incorporated herein by reference. Additional disclosure is set forth in U.S. Pat. No. 10,370,626, which his incorporated herein by reference in its entirety.

In an embodiment, the polymer component is not a xanthan gum. In some embodiments, and without being limited of a particular mechanism of action, a polysaccharide or gum having carboxyl groups (e.g. xanthan gum) can be employed with a peroxycarboxylic acid composition having a neutral pH, or a pH between about 6 and about 8, preferably about 7.

An effective amount of the polymer is provided to the peroxycarboxylic acid compositions to provide ready-to-use reduced inhalation risk compositions. Suitable concentrations of the polymer in a use solution of the peroxycarboxylic acid composition include between about 10 ppm to about 2,000 ppm, about 20 ppm to about 2,000 ppm, from about 50 ppm to about 2,000 ppm, or from about 100 ppm to about 1,200 ppm, or from about 0.001% and about 0.2% by weight, between about 0.002% and about 0.2% by weight, between about 0.005% and about 0.2% by weight, or between about 0.01% and about 0.2% by weight. Without being limited according to the invention, all ranges recited are inclusive of the numbers defining the range and include each integer within the defined range.

Additional Functional Ingredients

The components of the cleaning composition can further be combined with various functional components suitable for use in disinfecting and sanitizing applications. For example, in some embodiments few or no additional functional ingredients are disposed therein. In exemplary embodiments, such as those for protein processing, few or no additional ingredients are applied to a surface in need of disinfection, other than the high molecular weight polymer and peroxycarboxylic acid (further including the corresponding carboxylic acid and hydrogen peroxide). In some embodiments, water, an additional acid (e.g. mineral acid) and/or a peroxycarboxylic acid stabilizer can be combined with the high molecular weight polymer and/or peroxycarboxylic acid.

Exemplary peroxycarboxylic acid stabilizers can include pyridine carboxylic acid stabilizing agents, such as of 3-pyridinecarboxylic acid, 4-pyridinecarboxylic acid, 5-pyridinecarboxylic acid, 3,4-pyridinedicarboxylic acid, 3,5-pyridinedicarboxylic acid, 4,5-pyridinedicarboxylic acid, 3,4,5-pyridinetricarboxylic acid, oxides thereof, and/or salts thereof. Further exemplary peroxycarboxylic acid stabilizers can include pyridine carboxylic acid-based stabilizers, such as picolinic acid and salts, pyridine-2,6-dicarboxylic acid and salts, and phosphates and/or phosphonate based stabilizers, such as phosphoric acid and salts, pyrophosphoric acid and salts, most commonly 1-hydroxyethylidene-1,1-diphosphonic acid (HEDP) and salts. Additional disclosure of stabilizers is disclosed in U.S Publication No. 2020/0060265, U.S. Pat. No. 9,321,664, WO 91/07375 and U.S. Pat. No. 2,609,391, which are each incorporated herein by reference in its entirety. Stabilizing agents may be present in amounts sufficient to provide the intended stabilizing benefits, including in amounts from about 0.001 wt-% to about 25 wt-%, 0.01 wt-% to about 10 wt-%, and more preferably from about 0.01 wt-% to about 1 wt-%. Without limiting the scope of invention, the numeric ranges are inclusive of the numbers defining the range and include each integer within the defined range.

Exemplary acid additives can include mineral acids. Further exemplary acid additive scan include sulfuric acid ($H_2SO_4$), sodium hydrogen sulfate, nitric acid, sulfamic acid and sulfonic acids both alkyl and aryl, in particular methane sulfonic acid and dodecylbenzene, toluene, xylene, naphthalene and cumene sulfonic acid, and/or phosphoric acid ($H_3PO_4$). The acid additives can be included at a concentration from about 0.01 wt-% to about 50 wt-%, or from about 0.1 wt-% to about 50 wt-%. In still other embodiments, the acid has a concentration from about 0.1 wt-% to about 20 wt-%, or more preferably from about 0.1 wt-% to about 10 wt-%. Without limiting the scope of invention, the numeric ranges are inclusive of the numbers defining the range and include each integer within the defined range.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In other embodiments, the compositions may include peroxycarboxylic acid stabilizers, surfactants, defoaming agents, anti-redeposition agents, bleaching agents, solubility modifiers, dispersants, metal protecting agents, stabilizing agents, corrosion inhibitors, additional sequestrants and/or chelating agents, fragrances and/or dyes, rheology modifiers or thickeners, hydrotropes or couplers, buffers, solvents and the like. In particular hard surface sanitizing applications of use may utilize such exemplary additional functional ingredients with the high molecular weight polymers and peroxycarboxylic acids.

Methods Employing the Peroxycarboxylic Acid Composition for Poultry Processing

Methods of using the peroxycarboxylic acid compositions for various applications are provided. The invention includes a method for reducing a microbial population. These methods can operate on an article, substrate or surface, in a body or stream of water or a gas, or the like, by contacting the article, substrate or surface, body, or stream with a composition. The various articles, substrates or surfaces, can include various hard and soft surfaces. In an embodiment, the surfaces are hard surfaces. In further embodiments, a food surface and/or a food processing surface is contacted with the peroxycarboxylic acid compositions, such as in protein processing.

In some embodiments, the peroxycarboxylic acid compositions are suitable for use in reducing microbial contamination on poultry and in water used for washing or processing poultry. These methods include applying to the poultry during processing a peroxycarboxylic acid antimicrobial composition, preferably in an amount and time sufficient to reduce the microbial population. The composition can be applied by methods including submersing, rinsing, spraying, or air chilling the poultry, or a combination of these routes. During processing, the composition can be applied to whole, dismembered, portioned, or boned poultry. In some embodiments, the method can include recovering a peroxycarboxylic acid antimicrobial composition previously applied to poultry. The recovered composition can be treated by adding a sufficient amount of one or more peroxycarboxylic acids to yield a recycled peroxycarboxylic acid antimicrobial composition. The recycled mixed composition includes a reduced level of microbes, such as human pathogens, and can be disposed of more safely. Alternatively, the recycled mixed composition can be applied to poultry during processing.

A concentrate or a use composition can be employed for a variety of antimicrobial purposes, including for forming water-based systems for processing and/or washing poultry. The compositions and methods can be employed for processing poultry and/or poultry meat at any step from gathering the live birds through packaging the final product. For example, the compositions and methods can be employed for washing, rinsing, chilling, or scalding poultry carcasses, poultry carcass parts, or poultry organs for reducing contamination of these items with spoilage/decay-causing bacteria, and pathogenic bacteria. Before processing, live poultry are generally transported to and gathered at the beginning of a processing line. Poultry can be washed before entering the processing line. Processing typically begins with sacrificing the bird, typically by electrical stunning, followed by neck cutting and bleeding. A first washing step, known as scalding (e.g. submersion or immersion scalding) typically follows bleeding and loosens attachment of feathers to poultry skin. Submersion scalding typically includes immersing a stunned and bled bird into a scalding hot bath of water or a liquid antimicrobial composition, typically at a temperature of about 50° C. to about 80° C., preferably about 50° C. to about 60° C. The liquid antimicrobial composition in the bath can be agitated, sonicated, or pumped to increase contact of the composition with the carcass. Scalding is generally conducted in a scald tank or trough, which contains the scalding liquid with sufficient liquid depth to completely submerse the poultry carcass. The carcass is generally transported through the tank or trough by conveyor at a speed that provides a few minutes in the scalding liquid. The peroxycarboxylic acid compositions can be added to a scalding bath. The scalding bath can also include one or more of the additional ingredients permitted in scalding baths.

After submersion scalding, the poultry is typically picked and, optionally, singed before the next washing process. This second washing process is generally known as "dress" rinsing, "New York dress" rinsing, or post-pick rinsing, which rinses residual feathers and follicle residues from the carcass. Dress rinsing typically includes spraying a picked carcass with water, typically at a temperature of about 5° C. to about 30° C. To increase contact with the carcass, the peroxycarboxylic acid compositions in the spray water can be applied at higher pressures, flow rates, temperatures, or with agitation or ultrasonic energy. Dress rinsing is typically accomplished with a washing apparatus such as a wash or spray cabinet with stationary or moving spray nozzles. Alternatively, a "flood"-rinsing or liquid submersion washing apparatus may be used immediately after picking.

Dress rinsing is typically a final washing step before dismembering the poultry. Dismembering can include removing the head, the feet, eviscerating, and removing the neck, in any order commonly employed in poultry processing. The dismembered and eviscerated poultry can then be subjected to a washing step known as inside-outside bird washing (IOBW). Inside-outside bird washing washes the interior (body cavity) and exterior of the bird. Inside-outside bird washing typically includes rinsing the interior and exterior surfaces of the carcass with streams or floods of water, typically at a temperature of about 5° C. to about 30° C. To increase contact with the carcass, the peroxycarboxylic acid compositions in the spray water can be applied at higher pressures, flow rates, temperatures, or with agitation or ultrasonic energy. Inside-outside bird washing is generally accomplished by an apparatus that floods the bird carcass with streams of water in the inner cavity and over the exterior of the carcass. Such an apparatus can include a series of fixed spray nozzles to apply antimicrobial composition to the exterior of the bird and a rinse probe or bayonet that enters and applies antimicrobial composition to the body cavity. The inside-outside bird washing can be accomplished employing a peroxycarboxylic acid antimicrobial composition.

After inside-outside bird washing, both the interior and the exterior of the bird can be subjected to further decontamination. This further decontamination can be accomplished in part by a step commonly known as antimicrobial spray rinsing, sanitizing rinsing, or finishing rinsing. Such rinsing typically includes spraying the interior and exterior surfaces of the carcass with water, typically at a temperature of about 5 to about 30 C. To increase contact with the carcass, the antimicrobial compositions in the spray water can be applied using fixed or articulating nozzles, at higher pressures, flow rates, temperatures, with agitation or ultrasonic energy, or with rotary brushes. Spray rinsing is typically accomplished by an apparatus such as a spray cabinet with stationary or moving spray nozzles. The nozzles create a mist, vapor, or spray that contacts the carcass surfaces.

After spray rinsing, the bird can be made ready for packaging or for further processing by chilling, specifically submersion chilling or air chilling. Submersion chilling both washes and cools the bird to retain quality of the meat. Submersion chilling typically includes submersing the carcass completely in water or slush, typically at a temperature of less than about 5° C., until the temperature of the carcass approaches that of the water or slush. Chilling of the carcass can be accomplished by submersion in a single bath, or in two or more stages, each of a lower temperature. Water can be applied with agitation or ultrasonic energy to increase contact with the carcass. Submersion chilling is typically accomplished by an apparatus such as a tank containing the chilling liquid with sufficient liquid depth to completely submerse the poultry carcass. The carcass can be conveyed through the chiller by various mechanisms, such as an auger feed or a drag bottom conveyor. Submersion chilling can also be accomplished by tumbling the carcass in a chilled water cascade. The submersion chilling can also be accomplished employing a peroxycarboxylic acid antimicrobial composition.

Like submersion chilling, air chilling or cryogenic chilling cools the bird to retain quality of the meat. Air cooling can be less effective for decontaminating the bird, as the air typically would not dissolve, suspend, or wash away contaminants. Air chilling with a gas including an antimicrobial agent can, however, reduce the burden of microbial, and other, contaminants on the bird. Air chilling typically includes enclosing the carcass in a chamber having a temperature below about 5° C. until the carcass is chilled. Air chilling can be accomplished by applying a cryogenic fluid or gas as a blanket or spray. Air chilling can also be accomplished employing a peroxycarboxylic acid antimicrobial composition.

After chilling, the bird can be subjected to additional processing steps including weighing, quality grading, allocation, portioning, deboning, and the like. This further processing can also include use of the peroxycarboxylic acid compositions for washing. For example, it can be advantageous to wash poultry portions, such as legs, breast quarters, wings, and the like, formed by portioning the bird. Such portioning forms or reveals new meat, skin, or bone surfaces which may be subject to contamination and benefit from treatment with the composition. Similarly, deboning a poultry carcass or a portion of a poultry carcass can expose additional areas of the meat or bone to microbial contamination. Washing the deboned poultry carcass or portion with the peroxycarboxylic acid composition can advantageously reduce any such contamination. In addition, during any further processing, the deboned meat can also come into contact with microbes, for example, on contaminated surfaces. Washing the deboned meat with the peroxycarboxylic acid composition can reduce such contamination. Washing can be accomplished by spraying, immersing, tumbling, or a combination thereof, or by applying a gaseous or densified fluid antimicrobial composition.

Additional detail of methods of treating protein, including poultry protein, or other hard surfaces for antimicrobial efficacy are disclosed for example, in U.S. Pat. Nos. 6,514,556, 6,627,657, 6,635,286, 7,150,884, 7,288,274, 7,316,824, 7,504,123, 8,020,520, 8,246,429, 8,424,493, 9,247,738, and 10,342,231, which are herein incorporated by reference in their entirety.

In some embodiments, the spraying of peroxycarboxylic acid compositions onto a protein surface, such as poultry or other hard surfaces for antimicrobial efficacy, applies a use concentration of peroxycarboxylic acid (e.g. peroxyacetic acid) between about 1 ppm to about 2000 ppm, about 10 ppm to about 2000 ppm, about 20 ppm to about 2000 ppm, about 20 ppm to about 500 ppm, or about 20 ppm to about 220 ppm.

Additional Methods Employing the Peroxycarboxylic Acid Compositions

Methods of using the peroxycarboxylic acid compositions for various applications are provided. The invention includes a method for reducing a microbial population. These methods can operate on an article, substrate or surface, in a body or stream of water or a gas, or the like, by contacting the article, substrate or surface, body, or stream with a composition. The various articles, substrates or surfaces, can include various hard and soft surfaces. In particular embodiments, the methods and compositions are particularly well suited for hard surface disinfection.

Contacting can include any of numerous methods for applying a composition, such as spraying the compositions, immersing the article in compositions, foam or gel treating the article with the compounds or composition, or a combination thereof. In preferred embodiments to benefit from the increased particle size of the peroxycarboxylic acids, the compositions are sprayed onto a substrate or surface.

The compositions beneficially have activity against a wide variety of microorganisms such as Gram positive (for example, *Listeria monocytogenes* or *Staphylococcus aureus*) and Gram negative (for example, *Escherichia coli* or *Pseudomonas aeruginosa*) bacteria, yeast, molds, bacterial spores, viruses, etc. The compounds and compositions, as described above, have activity against a wide variety of human pathogens. The present compounds and compositions can kill a wide variety of microorganisms on a food processing surface, on the surface of a food product, in water used for washing or processing of food product, on a health care surface, or in a health care environment.

The present methods can be used to achieve any suitable reduction of the microbial population in and/or on the substrate or surface (also referred to as a target). In some embodiments, the present methods can be used to reduce the microbial population in and/or on the target or the treated target composition by at least one log 10, at least two log 10, at least three log 10, at least four log 10, or at least five log 10. Without limiting the scope of invention, the numeric ranges are inclusive of the numbers defining the range and include each integer within the defined range.

The compositions can be used for a variety of domestic or industrial applications, e.g., to reduce microbial or viral populations on a surface or object or in a body or stream of water. The compounds can be applied in a variety of areas including kitchens, bathrooms, factories, hospitals, dental offices and food plants, and can be applied to a variety of hard or soft surfaces having smooth, irregular or porous topography. Suitable hard surfaces include, for example, architectural surfaces (e.g., floors, walls, windows, sinks, tables, counters and signs); eating utensils; hard-surface medical or surgical instruments and devices; and hard-surface packaging. Such hard surfaces can be made from a variety of materials including, for example, ceramic, metal, glass, wood or hard plastic. Suitable soft surfaces include, for example paper; filter media; hospital and surgical linens and garments; soft-surface medical or surgical instruments and devices; and soft-surface packaging. Such soft surfaces can be made from a variety of materials including, for example, paper, fiber, woven or nonwoven fabric, soft plastics and elastomers. The compositions of the invention can also be applied to soft surfaces such as food and skin (e.g., a hand). The present compounds can be employed as a foaming or non-foaming environmental sanitizer or disinfectant.

The cleaning compositions can also be used on foods and plant species to reduce surface microbial populations; used at manufacturing or processing sites handling such foods and plant species; or used to treat process waters around such sites. For example, the compounds can be used on food transport lines (e.g., as belt sprays); boot and hand-wash dip-pans; food storage facilities; anti-spoilage air circulation systems; refrigeration and cooler equipment; beverage chillers and warmers, blanchers, cutting boards, third sink areas, and meat chillers or scalding devices. The compositions of the invention can be used to treat produce transport waters such as those found in flumes, pipe transports, cutters, slicers, blanchers, retort systems, washers, and the like. Particular foodstuffs that can be treated with compounds of the invention include eggs, meats, seeds, leaves, fruits and vegetables. Particular plant surfaces include both harvested and growing leaves, roots, seeds, skins or shells, stems, stalks, tubers, corms, fruit, and the like.

In some aspects, the compositions of the present invention are useful in the cleaning or sanitizing of containers, processing facilities, or equipment in the food service or food processing industries. The compositions have particular value for use on food packaging materials and equipment, and especially for cold or hot aseptic packaging. Examples of process facilities in which the compound of the invention can be employed include a milk line dairy, a continuous brewing system, food processing lines such as pumpable food systems and beverage lines, etc. Food service wares can be disinfected with the compound of the invention. For example, the compounds can also be used on or in ware wash machines, low temperature ware wash machines, dishware, bottle washers, bottle chillers, warmers, third sink washers, cutting areas (e.g., water knives, slicers, cutters and saws) and egg washers. Particular treatable surfaces include packaging such as cartons, bottles, films and resins; dish ware such as glasses, plates, utensils, pots and pans; ware wash and low temperature ware wash machines; exposed food preparation area surfaces such as sinks, counters, tables, floors and walls; processing equipment such as tanks, vats, lines, pumps and hoses (e.g., dairy processing equipment for processing milk, cheese, ice cream and other dairy products); and transportation vehicles. Containers include glass bottles, PVC or polyolefin film sacks, cans, polyester, PEN or PET bottles of various volumes (100 ml to 2 liter, etc.), one gallon milk containers, paper board juice or milk containers, etc.

Compositions of the present invention may also be used in a method of sanitizing hard surfaces such as institutional type equipment, utensils, dishes, health care equipment or tools, instruments and other hard surfaces.

A concentrate or use concentration of a compound of the present invention can be applied to or brought into contact with a target by any conventional method or apparatus for applying an antimicrobial or cleaning compound to an object. Contacting can be manual or by machine.

The various methods of treatment according to the invention can include the use of any suitable level of the peroxycarboxylic acid. In some embodiments, the treated target composition comprises from about 1 ppm to about 2,000 ppm of the cleaning compound when diluted for use. In further embodiments, the treated target composition comprises from about 10 ppm and about 2,000 ppm, 20 ppm and about 2,000 ppm, 20 ppm and about 1,800 ppm, 20 ppm and about 1,500 ppm, 25 ppm and about 1,500 ppm, 50 ppm and about 1,500 ppm, or about 50 ppm and about 1,000 ppm when diluted for use.

In an aspect, the methods include generating a use solution from a concentrate. A use solution may be prepared from the concentrate by diluting the concentrate with water at a dilution ratio that provides a use solution having desired sanitizing and/or other antimicrobial properties. The water that is used to dilute the concentrate to form the use composition can be referred to as water of dilution or a diluent, and can vary from one location to another. The typical dilution factor is between approximately 1 and approximately 10,000. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an aspect, a concentrated cleaning composition is diluted to use solution concentration of about 0.001% (wt/vol.) to about 10% (wt/vol.), or from about 0.001% (wt/vol.) to about 5% (wt/vol.), or from about 0.001% (wt/vol.) to about 2% (wt/vol.), or from about 0.01% (wt/vol.) to about 1% (wt/vol.). One skilled in the art can ascertain the concentrate compositions based on the dilution rates and the desired use solution concentrations disclosed herein. Without limiting the scope of invention, the numeric ranges are inclusive of the numbers defining the range and include each integer within the defined range.

The various applications of use described herein provide the cleaning compositions to a surface and/or water source. Beneficially, the compositions of the invention are fast-acting. However, the present methods require a certain minimal contact time of the compositions with the surface or product in need of treatment for occurrence of sufficient antimicrobial effect. The contact time can vary with concentration of the use compositions, method of applying the use compositions, temperature of the use compositions, pH of the use compositions, amount of the surface or product to be treated, amount of soil or substrates on/in the surface or product to be treated, or the like. The contact or exposure time can be about 15 seconds, at least about 15 seconds, about 30 seconds or greater than 30 seconds. In some embodiments, the exposure time is about 1 to 5 minutes. In other embodiments, the exposure time is a few minutes to hours. In other embodiments, the exposure time is a few hours to days. The contact time will further vary based upon the use concentration of actives of compositions according to the invention.

Beneficially the various applications of use described herein provide the cleaning compositions in a use composition that have an increase in the droplet size as a result of the combining of the high molecular weight polymer with the peroxycarboxylic acid. An increase in the droplet size includes a median particle size (i.e. diameter) about 10 microns or greater, about 11 microns or greater, about 50 microns or greater, about 70 microns or greater, about 100 microns or greater, about 150 microns or greater, or about 200 microns or greater. An exemplary suitable median particle size for a peroxyacetic acid use composition is at least about 50 microns. The increased droplet sizes results in various benefits, including, reduced misting and reduced atomization, which beneficially reduce inhalation hazards and risks.

Figure 5:
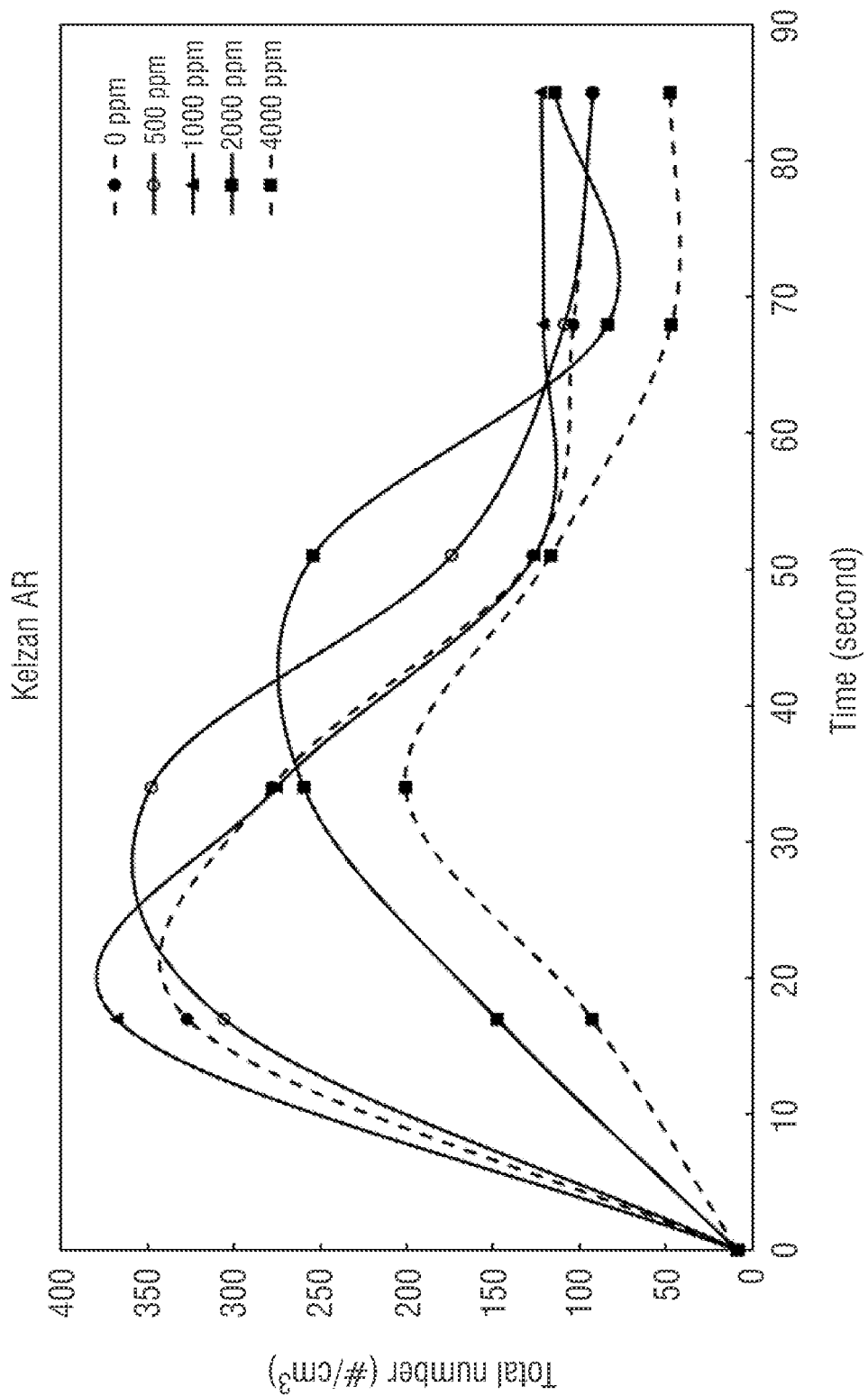
FIG. 5 shows the total number of particles sized 0.1 to 10 μm per $cm^3$ over time for PAA use solutions with varying amounts of Kelzan AR, an industrial-grade xanthan gum.

As a further benefit, the increase in drop size increases the elongational viscosity without significantly increasing shear viscosity. This beneficially provides consistent spray pattern and coverage provided by spraying the composition onto surfaces in need of treatment. The spray pattern and coverage is an important attribute of the peroxycarboxylic acid use compositions having increased elongational viscosity (in comparison to the peroxycarboxylic acid alone) as this allows spray delivery of the use composition onto surfaces without significant thickening by increasing the shear viscosity which allows spray delivery of the use composition without narrowing of the spray pattern or inability to spray due to increased shear viscosity. The increased elongational viscosity (in comparison to the peroxycarboxylic acid alone) also allows the mixing and spraying of concentrate compositions as the shear viscosity is not significantly increased while also providing the various reduced misting and reduced atomization benefits.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims. Commercial Product A is formulated to include the following raw materials.

The materials used in the following Examples are provided herein:

PAA Use Solution is a commercially available 1% solution of a 15.2% active peroxyacetic acid antimicrobial composition, dilution of 1:100 provides use solution of 1520 ppm peroxyacetic acid.

KELCO-VIS' is a diutan gum produced by CP Kelco.

Jaguar® HP-120 COS is a carboxymethyl hydroxypropyl guar gum produced by Solvay.

POLYOX™ WSR 303 is a polyethylene oxide thickener produced by Dow Chemical.

KELZAN AR is an industrial-grade xanthan gum produced by CP Kelco.

Guar Gum and Xanthan Gum as used herein in the Examples are food-grade xanthan gum and commercial-grade guar gum available from various sources.

Pemulen™ EZ-4U is a C10-30 alkyl acrylate crosspolymer produced by Lubrizol.

The test methodology used in the following Examples 1-6 is as follows:

Spray tests in the Examples were performed in a near-closed batch cabinet. Each sample was sprayed using the same spray head-transient trigger sprayer available from Ecolab. Specifically, a Part Number 95952395 sprayer was employed for each sample formulation, which was sprayed before each testing to ensure it was primed. The shower stall walls are again thoroughly wet down with water before application of the sample formulation. Particle counts from 0.1 to 10 µm were measured using a TSI OPS (optical particle sizer) particle size analyzer instrument to determine mass and number counts of spray mist for each formula sample after being sprayed into a shower stall. A TSI OPS device with Aerosol Instrument Manager (AIM) Software was employed for the following test methodology.

The OPS is connected to a power source and computer. The OPS is powered to begin data collection while the sample formulation is sprayed into the shower stall. Each sample formulation is sprayed 40 times around the shower stall and the OPS collects the data for the sample formulation. During the testing drafts of air are avoided as they may disrupt sample collection by dispersing particles away from the test area.

The cap of OPS is removed to allow air to pass through the inlet at a rate of 1 L/min and is positioned within the "breathing zone" of the shower stall. As referred to herein, the breathing zone refers to the area wherein mist comes back towards a user who sprays a cleaning formulation for a particular cleaning application, after contacting a surface in need of cleaning. The testing for this Example established the "breathing zone" for the exemplary test as approximately 35 inches in height and 15 inches from the shower wall to the location of OPS device. Additional dimensions of the shower stall included 54 inches from the floor to spray nozzle, 55 inches from the floor to air inlet, 80 inches from the floor to the top of curtains, and 58 inches wide (shower stall). The shower stall walls are thoroughly wet down with water. An initial measurement is obtained and recorded for the air before testing any samples.

The PAA use solution with varying amounts of polymers were sprayed with a trigger sprayer 40 times in 30 seconds. The sum of the total particles sized 0.1 to 10 μm was measured 5 times, in 17 second intervals.

After each tested sample formulation, the shower stall is aired out, such as by using a fan or opening doors to the area to air out particles that were previously sprayed with the sample formulation. The remaining sample formulations are tested using the same procedure.

Example 1

Amounts of 0, 40, 400, 1000 and 2000 ppm of Kelco-VIS diutan gum were added to a PAA use solution and then put through the test methodology described above to measure the sum of the total mist particles sized 0.1 to 10 μm. The results are shown in FIG. 1. FIG. 1 shows that the total number of particles per $cm^3$ is significantly lowered compared to Control (which does not include any polymer and/or other rheology modifier), in particular the most significant decrease in mist particles sized 0.1 to 10 μm is when the amount of diutan gum is 1000 ppm or above, compared to the solution with no polymer. However, a benefit is seen with as low as 40 ppm polymer added where there is a shift in time (seconds) for how long it takes for the misting particles to reach the OPS device. It also reduces the total particle numbers as is achieved by the diutan gum concentrations at 1000 ppm and 2000 ppm.

Example 2

Amounts of 0, 500, 1000, 2000 and 4000 ppm of Jaguar HP-120 a cationic guar gum were added to a PAA use solution and then put through the test methodology described above to measure the sum of the total mist particles sized 0.1 to 10 μm. The results are shown in FIG. 2. FIG. 2 shows that the total number of particles per $cm^3$ is significantly lowered when the guar gum is combined with the peroxycarboxylic acid at all tested amounts. In particular, when the amount of guar gum is 1000 ppm or above the most significant efficacy is seen in comparison to the solution with no polymer.

Example 3

An additional guar gum was evaluated following the testing in Example 2. Amounts of 0, 500, 1000, and 2000 ppm of guar gum (food grade) were added to a PAA use solution and then put through the test methodology described above to measure the sum of the total mist particles sized 0.1 to 10 μm. The results are shown in FIG. 3. FIG. 3 shows that the total number of particles per $cm^3$ is significantly lowered when the amount of food-grade guar gum is 1000 ppm or above, compared to the solution with no polymer. Again, a significant benefit in the reduction and slowing in rate of the misting of the particles is seen even at the 500 ppm guar gum showing a clear improvement over the Control with no polymer. There are differences in the total particles in this test compared to the first two evaluations which one skilled in the art understands can result from differences in testing parameters, e.g. air flow conditions in a laboratory, difference in force and time with a manual sprayer. However, the results again show a reduction in missing of the particles.

Example 4

Amounts of 0, 100, 200, 500, and 1000 ppm of WSR 303 (polyethylene oxide) were added to a PAA use solution and then put through the test methodology described above to measure the sum of the total mist particles sized 0.1 to 10 μm. The results are shown in FIG. 4. FIG. 4 shows that the total number of particles per $cm^3$ is significantly lowered when the amount of polyethylene oxide is 100 ppm or above, compared to the solution with no polymer. The polyethylene oxide polymer is very efficient at low concentration levels including between about 100-200 ppm at thickening and providing anti-misting to the peroxycarboxylic acid.

The WSR 303 is a long chain polyethylene oxide that does not have any carboxyl group and has no pendant group, making it long but not "bulky" and therefore provides the high elongational viscosity for anti-misting, yet relatively low shear viscosity for ease of spraying and processing. The polymer is compatible with the peroxycarboxylic acid use solutions.

Example 5

Amounts of 0, 500, 1000, 2000 and 4000 ppm of Kelzan AR were added to a PAA use solution and then put through the test methodology described above to measure the sum of the total mist particles sized 0.1 to 10 μm. The results are shown in FIG. 5. FIG. 5 shows no clear trend at lower concentrations (from 500 ppm to 2000 ppm) of industrial-grade xanthan gum, and at 4000 ppm the total numbers were still close to 50% of the 0 ppm use solution.

Figure 6:
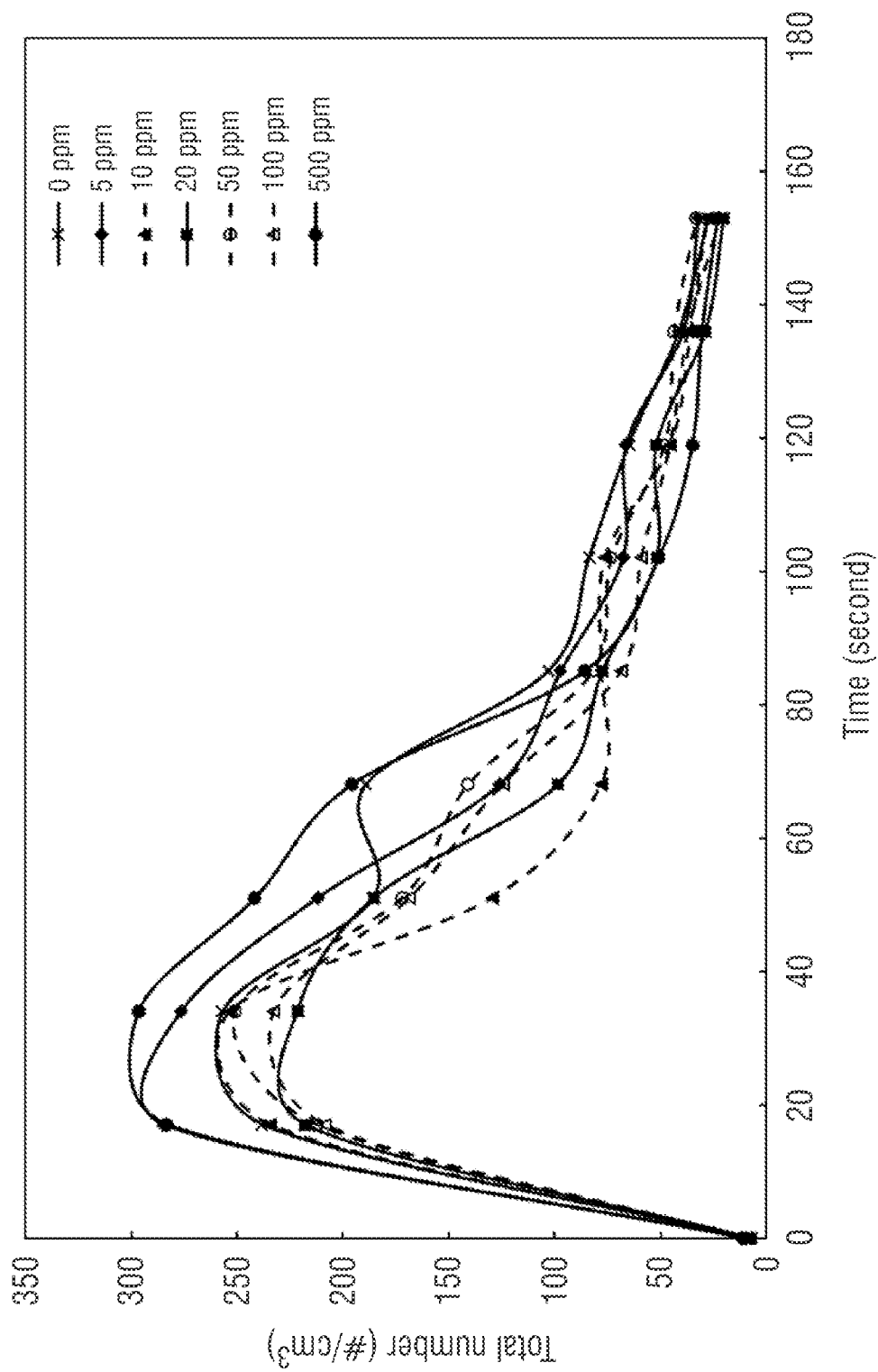
FIG. 6 shows the total number of particles sized 0.1 to 10 μm per $cm^3$ over time for PAA use solutions with up to 500 ppm of food-grade xanthan gum.
Figure 7:
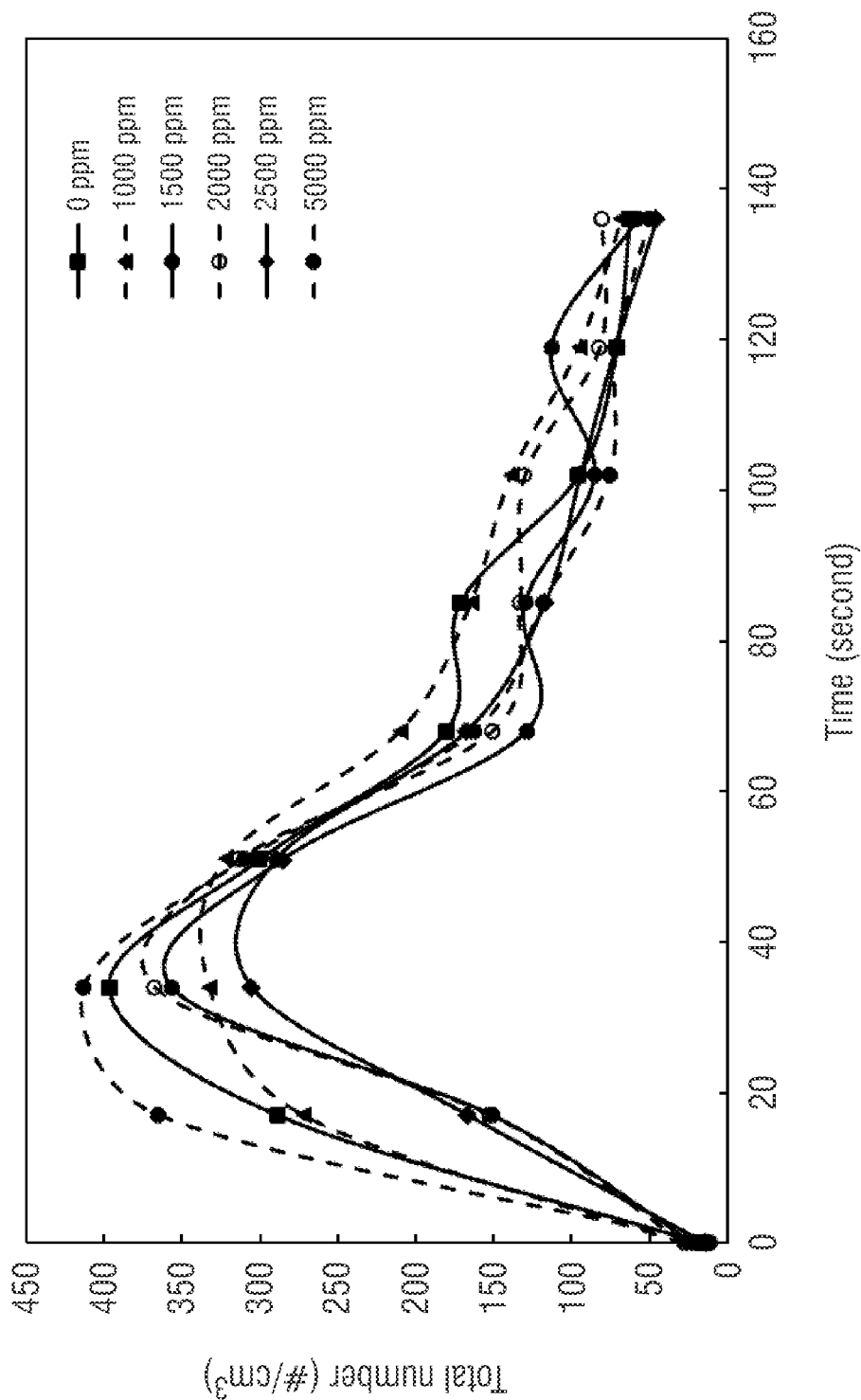
FIG. 7 shows the total number of particles sized 0.1 to 10 μm per $cm^3$ over time for PAA use solutions with 1000 to 5000 ppm of food-grade xanthan gum.

Amounts of 0, 5, 10, 20, 50, 100, 500, 1000, 1500, 2000, 2500, and 5000 ppm of food-grade xanthan gum were added to a PAA use solution and then put through the test methodology described above to measure the sum of the total mist particles sized 0.1 to 10 µm. The results are shown in FIGS. 6 and 7. FIG. 6 shows the results for the lower concentrations (up to 500) and FIG. 7 shows the results for the higher concentrations (1000 to 5000). FIGS. 6 and 7 indicate that there is no clear trend or effect on the number of total particles with these concentrations of xanthan gum.

Without being limited to a particular mechanism of action, the relative lack of efficacy of the xanthan gum compared to the polymers in Examples 1-4 is believed to be due to the presence of carboxyl groups in the xanthan gum structure. The carboxyl groups are susceptible to the peroxycarboxylic acids in use solutions which are acidic, a clear compatibility and structure relationship. The acidic solutions can protonate the carboxyl groups causing the polymer network to fold and therefore not fully extend in solution to provide thickening and anti-misting properties. In an embodiment, a neutral peroxycarboxylic acid use solution may minimize this compatibility issue and allow the natural gums (i.e. xanthan gum) to be utilized in the compositions.

It is surprising that gums which are conventionally believed to effectively thicken compositions perform differently with the peroxycarboxylic acids. The xanthan gum performance is distinct from diutan gum and guar gums which are significantly more effective at reducing the total number of particle sizes between 0.1 to 10 µm of the peroxycarboxylic acid composition which is believed to correlate to the structure having a majority of carboxyl groups replaced with hydroxyl groups in the structure of the diutan gum, and the lack of carboxyl groups in the guar gums. Similarly, these benefits based on the structure of the polymer are confirmed by the performance of the polyethylene oxide polymer that does not include carboxyl groups.

Example 6

Figure 8:
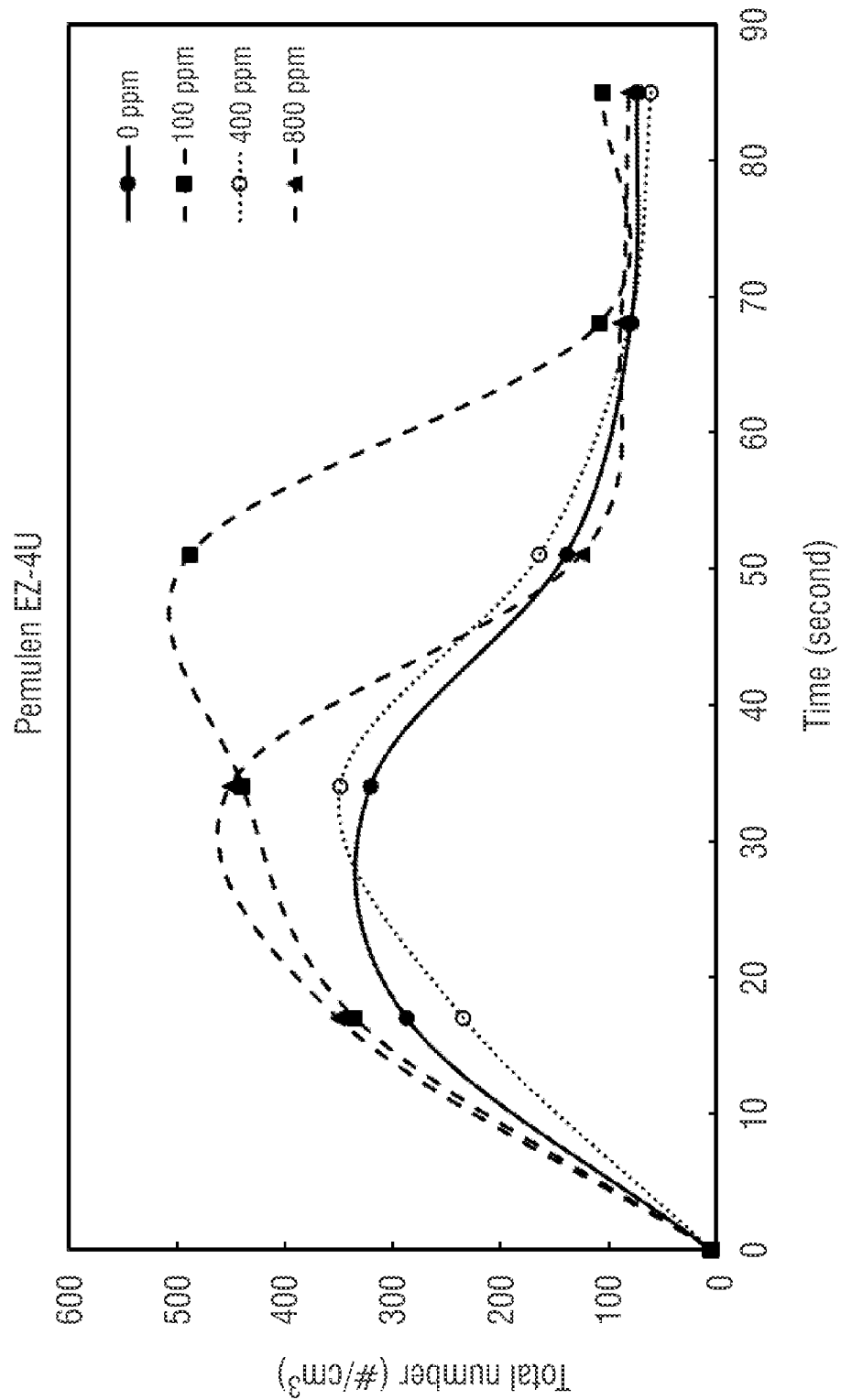
FIG. 8 shows the total number of particles sized 0.1 to 10 μm per $cm^3$ over time for PAA use solutions with varying amounts of Pemulen EZ-4U, a C10-30 alkyl acrylate cross polymer.

Amounts of 0, 100, 400, and 800 ppm of Pemulen EZ-4U (alkyl acrylate crosspolymer) were added to a PAA use solution and then put through the test methodology described above to measure the sum of the total mist particles sized 0.1 to 10 µm. The results are shown in FIG. 8. FIG. 8 indicates that there is no clear trend or effect on the number of total particles with these concentrations of a C10-30 alkyl acrylate crosspolymer. Pemulen EX-4U has the highest shear viscosity of all the tested thickeners. This test was completed using a crosspolymer known to significantly increase the viscosity of solutions and demonstrates the efficacy of anti-misting is not solely tied to increasing viscosity. As the results show an increase in concentration and therefore viscosity does not result in an anti-misting efficacy in the peroxycarboxylic acid composition. This confirms there is an unexpected performance benefit achieved by the gums having carboxyl groups replaced with hydroxyl groups and the PEO polymer without carboxyl groups.

Example 7

Test compositions were sprayed into a portable shower and the particle that 'blew back' into the inhalation zone of a user was measured to determine particle size of PAA modified with POLYOX™ WSR 303 (polyethylene oxide thickener). A sensor was set up two feet from shower opening and rested on a two foot tall step-ladder. 30 sprays were completed. Recorded data included the maximum peroxycarboxylic acid air concentration; time until reading reaches a 30 second TWA concentration of 0 ppm; and time of first and last spray. Data was collected with an ChemDAQ Sensor (air sampling device). The ChemDAQ Sensor works by the PAA diffusing into the sensor, through the back of the porous membrane to the working electrode where it is oxidized or reduced. The electrochemical reaction results in an electric current that passes through the external circuit.

Figure 9A:
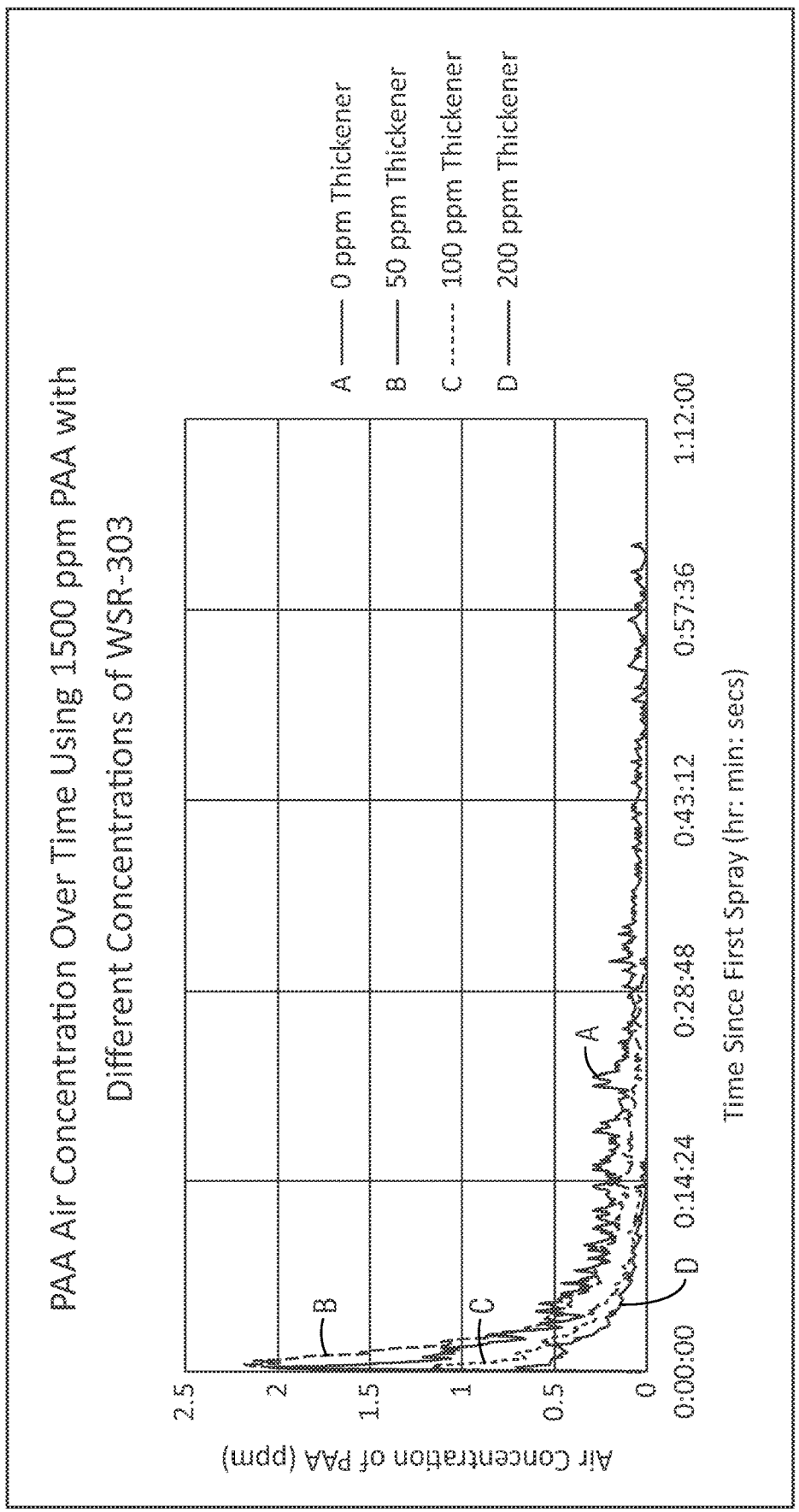
Figure 9B:
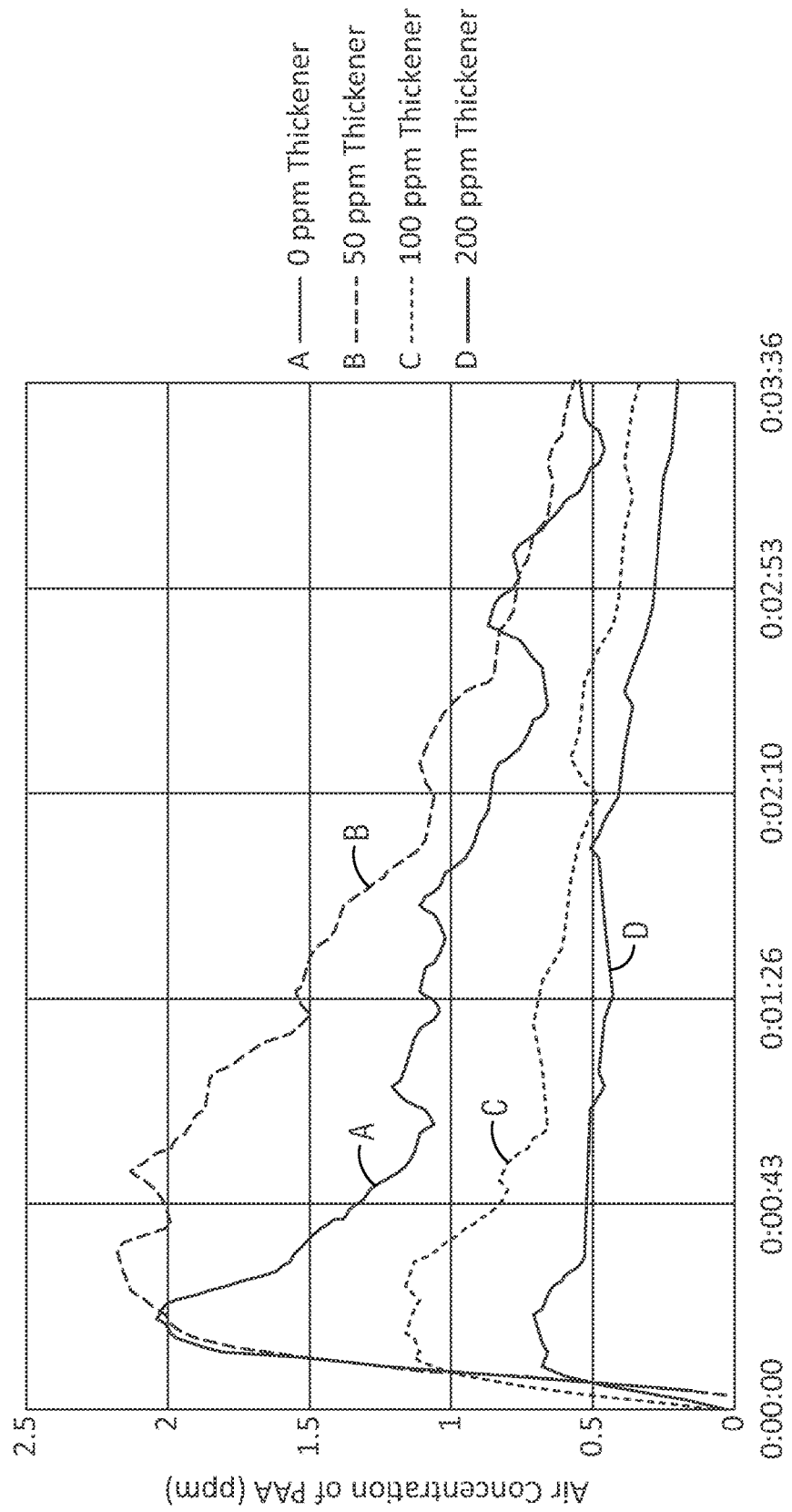
Figure 9C:
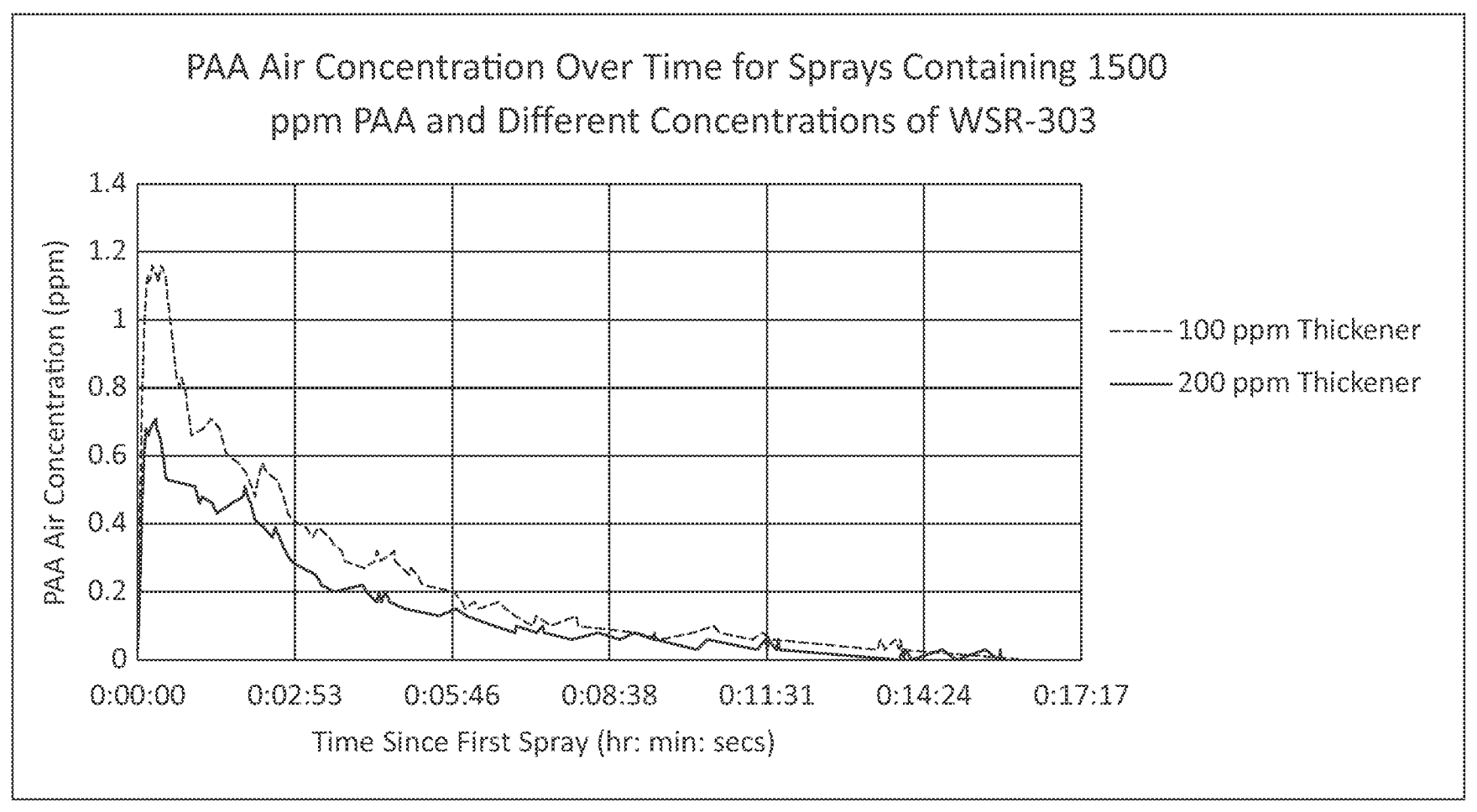

FIG. 9 shows the measured PAA air concentration over time using 1500 ppm PAA with varying concentrations of the high molecular weight polymer (POLYOX™ WSR 303 polyethylene oxide thickener). As shown the increase in high molecular weight polymer above 50 ppm shows a beneficial decrease in the total air concentration (ppm) of the PAA, whereas FIG. 9A shows the measurements over approximately 1 hour, and FIG. 9B is an expanded version of the graph depicting the measured air concentration over approximately 3 minutes. FIG. 9C shows the results of the 100 ppm versus 200 ppm high molecular weight polymer for additional time beyond what is shown in the FIG. 9B, and in particular showing a decrease in maximum PAA concentration by about 38.8%.

These results follow-up to the testing in Example 4 (which used TSI particle number measurement) for the high molecular weight polymer (POLYOX™ WSR 303 polyethylene oxide thickener). The preliminary experiments in Example 4 used the particle size analyzer which measured the particle size distribution in a range of 0.3 um to 10 um. Based on this initial testing it was understood that fewer particle numbers indicate less surface area for PAA evaporating into the air.

This testing in FIGS. 9A-9C shows a clear correlation between the particle numbers and PAA air concentrations in the same experimental setup. The PAA concentration was shown to be proportional with the particle numbers. This further demonstrates that when the high molecular weight thickener is added into the PAA solution it has the same impact on both the particle size and the consequent PAA concentration. The results are also shown in Table 2 where the increased concentration of the high molecular weight thickener significantly decreased the time until no detectable PAA concentration in the air was detected.

TABLE 2

| Concentration of Thickener (ppm) | Maximum PAA Air Concentration (ppm) | Percent of Un-thickened Maximum Concentration | Time Until No Signal |
|---|---|---|---|
| 0 | 2.04 | 100% | 67:50 |
| 50 | 2.18 | 107% | 31:34 |
| 100 | 1.16 | 56.9% | 16:46 |
| 200 | 0.71 | 34.8% | 16:24 |

Further confirmational evidence is seen in that more tiny droplets were formed without thickener is the time needed for the ChemDAQ to reach zero reading (no measured air concentration of the PAA) after spray. Approximately 1 hour (as shown in FIG. 9A) time passed for the untreated solution vs 15 minutes for 200 ppm POLYOX™ WSR 303 solution, which is due to the smaller the particle size, the longer it floats in air.

Figure 10A:
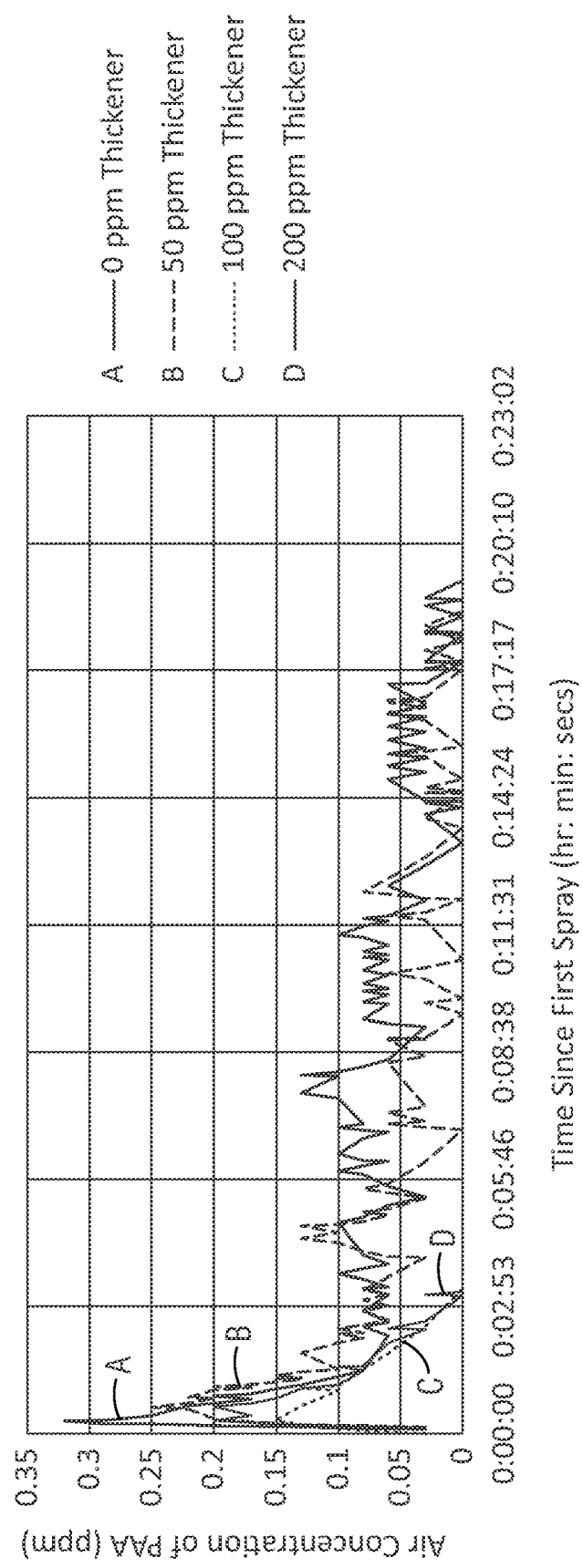
Figure 10B:
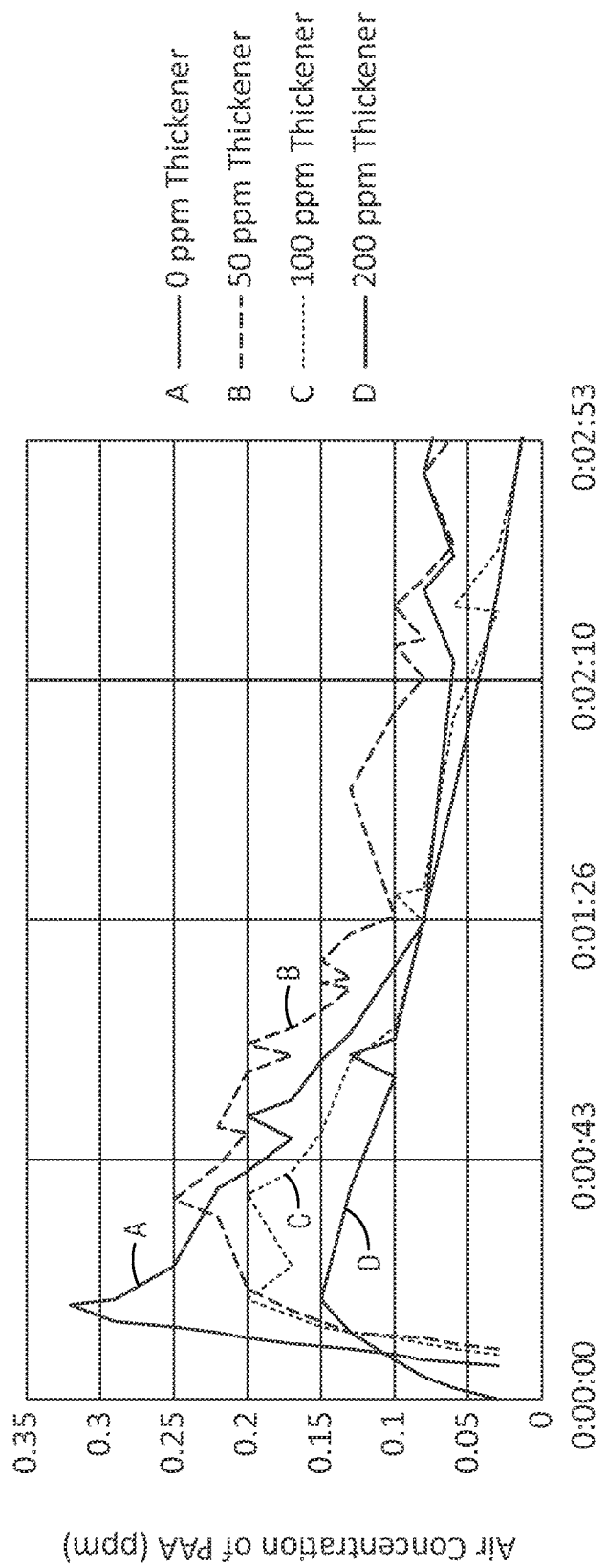

FIG. 10 shows the measured PAA air concentration over time using a lower concentration of PAA, 200 ppm PAA, with varying concentrations of the high molecular weight polymer (POLYOX™ WSR 303 polyethylene oxide thickener). As shown the increase in high molecular weight polymer above 50 ppm shows a beneficial decrease in the total air concentration (ppm) of the PAA, whereas FIG. 10A shows the measurements over approximately 20 minutes, and FIG. 10B is an expanded version of the graph depicting the measured air concentration over approximately 2.5 minutes. The results are also shown in Table 3 where the increased concentration of the high molecular weight thickener significantly decreased the time until no detectable PAA concentration in the air was detected.

TABLE 3

| Concentration of Thickener (ppm) | Maximum PAA Air Concentration (ppm) | Percent of Un-thickened Maximum Concentration | Time Until No Signal |
| --- | --- | --- | --- |
| 0 | 0.32 | 100% | 19:56 |
| 50 | 0.25 | 78.1% | 19:08 |
| 100 | 0.20 | 62.5% | 3:44 |
| 200 | 0.15 | 46.9% | 3:58 |

Example 8

Figure 11A:
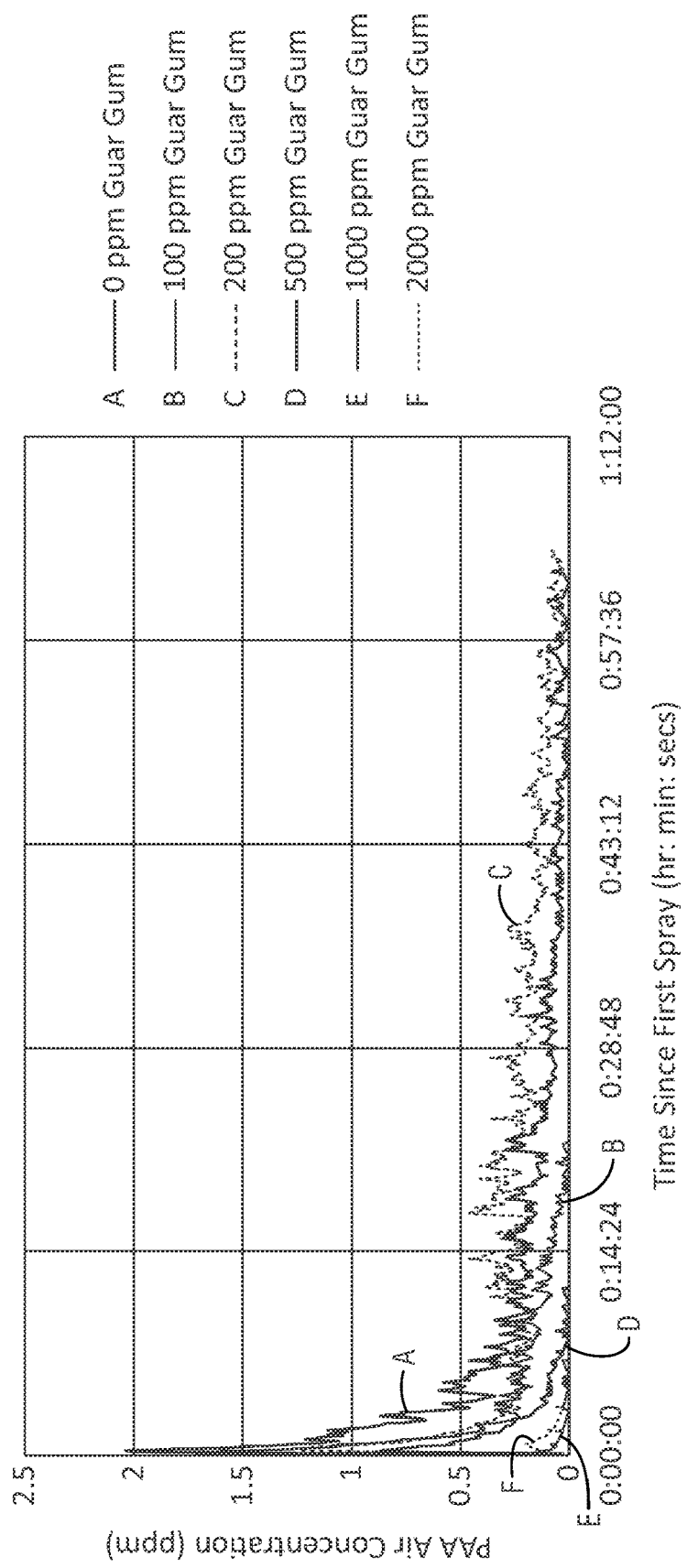
Figure 11B:
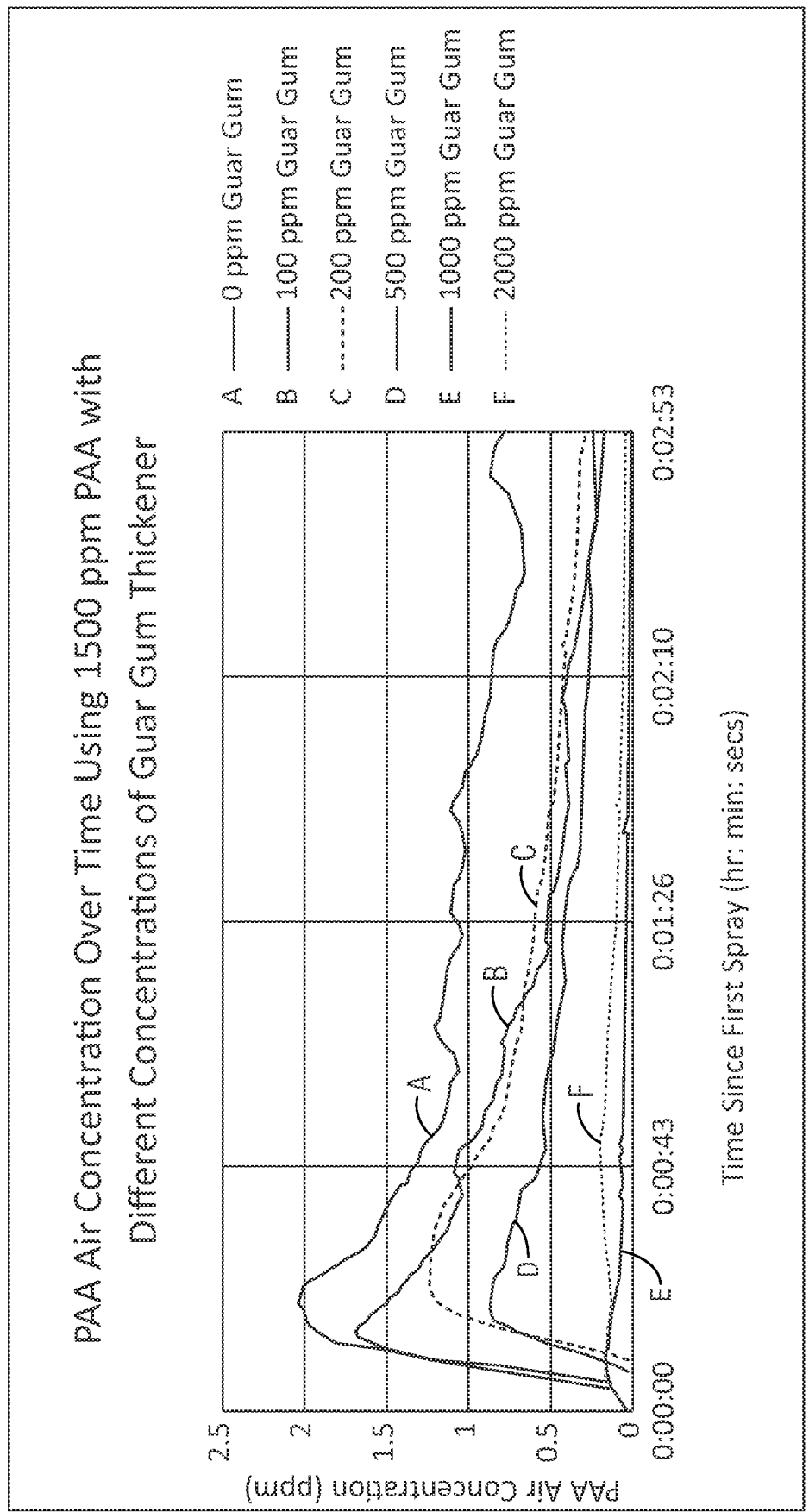

The testing of Example 7 was repeated using guar gum as the high molecular weight polymer. FIG. 11A shows the measured PAA air concentration over time using 1500 ppm PAA with varying concentrations of the high molecular weight polymer guar gum. As shown the increasing concentration of the high molecular weight polymer provides beneficial decrease in the total air concentration (ppm) of the PAA. FIG. 11A shows the measurements over approximately 1 hour, and FIG. 11B is an expanded version of the graph depicting the measured air concentration over approximately 3 minutes. The results are also shown in Table 4.

TABLE 4

| Concentration of Thickener (ppm) | Maximum PAA Air Concentration (ppm) | Percent of Un-thickened Maximum Concentration | Time Until No Signal |
| --- | --- | --- | --- |
| 0 | 2.04 | 100% | 67:50 |
| 100 | 1.69 | 82.8% | 22:38 |
| 200 | 1.24 | 60.8% | 60:00+ |
| 500 | 0.87 | 42.6% | 11:11 |
| 1000 | 0.20 | 9.8% | 5:31 |
| 2000 | 0.17 | 8.3% | 6:15 |

The results in Table 4 show a consistent decrease in the air concentration of PAA as the concentration of guar gum increases, with a general trend of decreasing the time until no PAA is detected with the guar gum concentration increase (compared to control).

Example 9

An assessment on the spray volume of PAA (untreated, negative control) compared to PAA modified with high molecular weight polymers was completed. The average mass of solution from 30 sprays of each solution was measured as shown in Table 5.

TABLE 5

| | |
| --- | --- |
| Average mass of solution from 30 sprays using untreated PAA | 32.3 gram |
| Average mass of solution from 30 sprays using PAA with 200 ppm Polyox | 34.7 gram |
| Average mass of solution from 30 sprays using PAA with 200 ppm Guar Gum | 31.4 gram |

Figure 12:
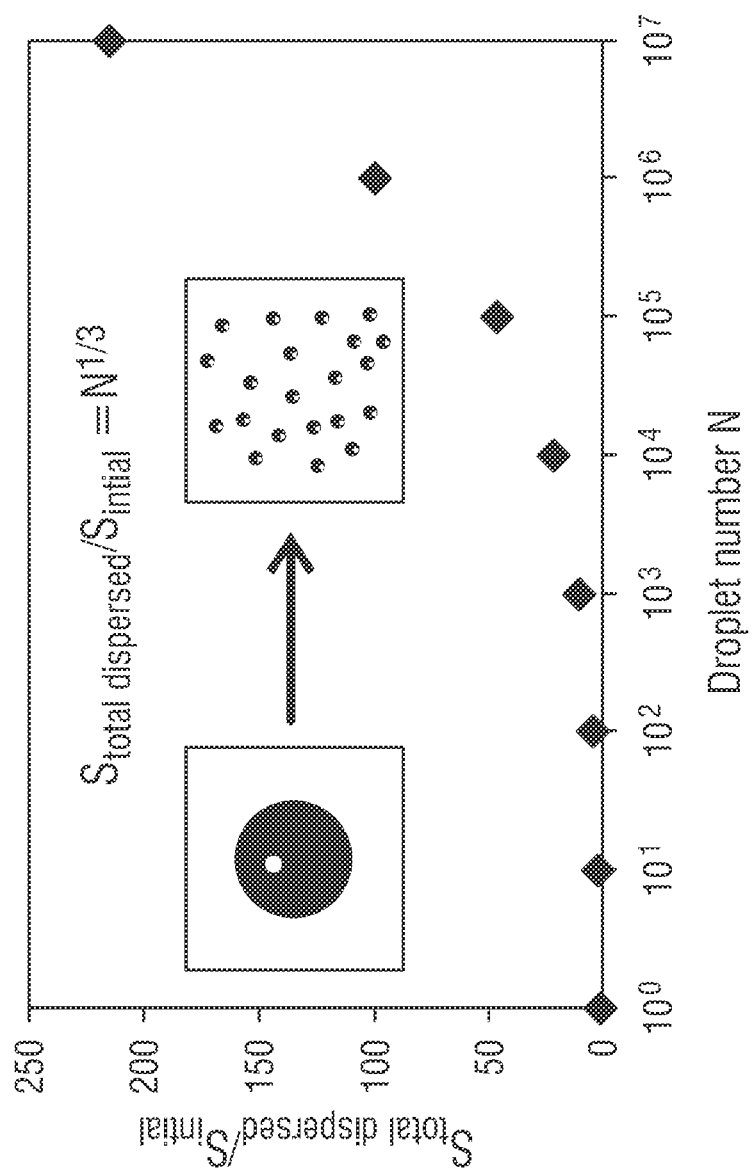

As shown, use of the high molecular weight thickener results in +5.34% difference, whereas use of the guar gum results in a slight decrease at the 200 ppm (although earlier Examples show preference for increased concentrations of the guar gum for thickening). Table 5 shows there was no significant impact of mass sprayed with the thickener. The spray experiments could be considered to have a constant mass spraying every time. Depicted in FIG. 12 is the relation of the total surface area and droplet numbers with a constant mass. The relation of the total surface area and droplet numbers with a constant mass is shown; with much more droplets, the surface area also dramatically increased.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A peroxycarboxylic acid use composition, comprising:
   a peroxycarboxylic acid; and
   a high molecular weight polymer comprising a polysaccharide or gum that does not have carboxyl groups or a polyethylene oxide, wherein the polymer is physically compatible with the peroxycarboxylic acid;
   wherein the peroxycarboxylic acid is modified by the high molecular weight polymer to have a median particle size that is greater than about 50 microns (μm) in diameter, and
   wherein the use composition has an increased elongational viscosity providing a spray pattern without increasing shear viscosity.

2. The composition of claim 1, further comprising a carboxylic acid, hydrogen peroxide and/or water.

3. The composition of claim 1, wherein the gum is a guar gum or diutan gum.

4. The composition of claim 3, wherein the diutan gum is present at a use concentration of about 250 ppm or greater, or wherein the guar gum is present at a use concentration of about 500 ppm or greater and is food grade.

5. The composition of claim 1, wherein the polyethylene oxide is present at a use concentration of about 100 ppm or greater and/or wherein the polyethylene oxide has a molecular weight of at least about 3,000,000 Da.

6. The composition of claim 1, wherein the composition has a viscosity of about 1 to about 1000 cPs.

7. The composition of claim 1, wherein the pH of the composition is between about 0 and about 7.

8. The composition of claim 1, wherein the peroxycarboxylic acid is a C1-C22 peroxycarboxylic acid and is present in the use solution from about 10 ppm to about 1,500 ppm.

9. The composition of claim 1, further comprising at least one additional functional ingredient selected from the group consisting of a peroxycarboxylic acid stabilizer, surfactant, additional thickener and/or viscosity modifier, solvent, solubility modifier, humectant, metal protecting agent, stabilizing agent, corrosion inhibitor, sequestrant and/or chelating agent, pH modifying component, fragrance and/or dye, hydrotrope or coupler, and a buffer.

10. The composition of claim 1, that is formed at a point or application of use.

11. A method of increasing peroxycarboxylic acid composition particle size to reduce vapor levels and inhalation risk comprising:

combining a high molecular weight polymer comprising a polysaccharide or gum that does not have carboxyl groups or a polyethylene oxide, with a peroxycarboxylic acid to make a cleaning composition according to claim 1;

increasing the particle size of the cleaning composition in a use solution when sprayed to having a median particle size greater than about 50 microns, reducing the number of particle sizes having a diameter between about 0.1 to about 10 microns, and thereby reducing the vapor level in the air to reduce inhalation risk.

12. The method of claim 11, wherein the vapor pressure of the peroxycarboxylic acid is reduced, wherein misting of the use solution of the cleaning composition is reduced, and/or wherein atomization of the use solution of the cleaning composition is reduced.

13. The method of claim 11, wherein the combining of the high molecular weight polymer and the peroxycarboxylic acid can be at a point of use and/or dilution, and wherein the combining is in a formulated use of concentrate composition.

14. The method of claim 11, wherein the spraying of the cleaning composition use solution uses a trigger sprayer or a commercially-acceptable spray nozzle.

15. A method of cleaning, sanitizing, and/or disinfecting comprising:

applying to a substrate a cleaning composition of claim 1;

wherein the applying step is by spraying the composition onto the substrate;

wherein the composition provides at least 4 log kill on treated surfaces while providing a reduced inhalation risk.

* * * * *